United States Patent
Takahashi

(10) Patent No.: US 11,460,306 B2
(45) Date of Patent: Oct. 4, 2022

(54) INFORMATION PROCESSING APPARATUS, INFORMATION PROCESSING METHOD, AND PROGRAM

(71) Applicant: STROLY INC., Kyoto (JP)

(72) Inventor: Toru Takahashi, Kyoto (JP)

(73) Assignee: STROLY INC., Kyoto (JP)

( * ) Notice: Subject to any disclaimer, the term of this patent is extended or adjusted under 35 U.S.C. 154(b) by 231 days.

(21) Appl. No.: 16/640,923

(22) PCT Filed: Aug. 25, 2017

(86) PCT No.: PCT/JP2017/030489
§ 371 (c)(1),
(2) Date: Feb. 21, 2020

(87) PCT Pub. No.: WO2019/038905
PCT Pub. Date: Feb. 28, 2019

(65) Prior Publication Data
US 2020/0208996 A1  Jul. 2, 2020

(51) Int. Cl.
*G01C 21/32* (2006.01)
*G06F 16/29* (2019.01)
*G01C 21/00* (2006.01)

(52) U.S. Cl.
CPC ........... *G01C 21/32* (2013.01); *G01C 21/005* (2013.01); *G06F 16/29* (2019.01)

(58) Field of Classification Search
CPC .. G01C 21/32; G01C 21/005; G01C 21/3856; G06F 16/29; G09B 29/007
See application file for complete search history.

(56) References Cited

U.S. PATENT DOCUMENTS

| 2004/0080510 A1* | 4/2004 | Inokuchi ............. G06F 16/9537 345/440 |
| 2009/0292458 A1 | 11/2009 | Nakamura et al. |
| 2015/0339305 A1* | 11/2015 | Murata ................... G06F 16/74 707/722 |

FOREIGN PATENT DOCUMENTS

| JP | H08-297466 A | 11/1996 |
| JP | 2002-90157 A | 3/2002 |

(Continued)

OTHER PUBLICATIONS

JP-2016090792-A English Translation.*

(Continued)

*Primary Examiner* — Rami Khatib
*Assistant Examiner* — Gabriel J Lambert
(74) *Attorney, Agent, or Firm* — McDermott Will & Emery LLP

(57) ABSTRACT

An information processing apparatus includes: a map expression data storage unit in which two or more pieces of map expression data expressing a map are stored, the data being associated with one or more attribute values containing region specifying information for specifying a region that is being expressed; a receiving unit that receives position specifying information for specifying a position from a terminal apparatus; a data acquiring unit that acquires one or more pieces of map expression data associated with region specifying information corresponding to a position specified with the position specifying information, from the map expression data storage unit; and a transmitting unit that transmits the one or more pieces of map expression data acquired by the data acquiring unit, to the terminal apparatus.

18 Claims, 18 Drawing Sheets

(56) References Cited

FOREIGN PATENT DOCUMENTS

| JP | 2011-154172 A | 8/2011 | | |
|----|---------------|--------|---|---|
| JP | 2011-163845 A | 8/2011 | | |
| JP | 2011-259315 A | 12/2011 | | |
| JP | 2012-018175 A | 1/2012 | | |
| JP | 2015-191028 A | 11/2015 | | |
| JP | 2016-90792 A | 5/2016 | | |
| JP | 2016090792 A | * | 5/2016 | ............. G09B 29/00 |

OTHER PUBLICATIONS

International Search Report issued in corresponding International Application No. PCT/JP2017/030489, dated Nov. 28, 2017, with English translation.
Notice of Reasons for Refusal issued in corresponding Japanese Application No. 2018-503602, dated May 16, 2018 (with English Machine Translation).
Notice of Reasons for Refusal issued in corresponding Japanese Application No. 2018-503602, dated Aug. 9, 2018 (with English Machine Translation).
Notice of Reasons for Refusal issued in corresponding Japanese Application No. 2018-503602, dated Oct. 18, 2018 (with English Machine Translation).
Decision of Refusal iaaued in corresponding Japanese Application No. 2018-503602, dated Jan. 18, 2019 (with English Machine Translation).
Extended European Search Report dated Mar. 18, 2021, issued in EP Application No. 17922849.9.
First Office Action issued in corresponding Chinese Patent Application 201780094018.4, dated Apr. 28, 2021 w/ English machine translation.

* cited by examiner

| ID | Static attribute value ||||| Dynamic attribute value |||| Map expression data |
|---|---|---|---|---|---|---|---|---|---|---|
| | Region specifying information | Scale factor | Area | Completion level | Metadata | User action information |||  Evaluation value | |
| | | | | | | Number of DLs | Number of views per month | Average access time | | |
| M01 | $(x_{11}, y_{11})$<br>$(x_{12}, y_{12})$ | 1/10,000 | 28,000 | 4 | Illustrated map | 2310 | 328 | 5 m 12 s | 3.5 | |
| M02 | $(x_{21}, y_{21})$<br>$(x_{22}, y_{22})$ | 1/5,000 | 3,500 | 5 | Old map | 15708 | 1295 | 3 m 18 s | 4.5 | |
| M03 | $(x_{31}, y_{31})$<br>$(x_{32}, y_{32})$<br>$(x_{33}, y_{33})$<br>$(x_{34}, y_{34})$<br>$(x_{35}, y_{35})$<br>$(x_{36}, y_{36})$<br>$(x_{37}, y_{37})$<br>$(x_{38}, y_{38})$ | 1/25,000 | 31,000 | 3 | Old map | 239 | 58 | 1 m 50 s | 4.1 | |
| ... | ... | ... | ... | ... | ... | ... | ... | ... | ... | ... |

FIG. 8

| User identifier | User attribute | | | History information | | | | Current information | | |
|---|---|---|---|---|---|---|---|---|---|---|
| | Age | Sex | ... | Browsing date | Browsed map identifier | Browsing time | ... | Map identifier of current browsing | Browsing time | ... |
| U01 | 38 | Male | ... | 2017/4/5 | M09 | 5 m 10 s | ... | M02 | 1 m 05 s | ... |
| | | | | 2017/7/8 | M01 | 2 m 18 s | ... | | | ... |
| | | | | 2017/8/15 | M29 | 1 m 10 s | ... | | | ... |
| U02 | 25 | Female | ... | 2017/8/11 | M03 | 6 m 11 s | ... | - | - | ... |
| U03 | 49 | Male | ... | 2017/7/21 | M02 | 3 m 17 s | ... | M01 | 51 s | ... |
| ... | ... | ... | ... | ... | ... | ... | ... | ... | ... | ... |

FIG.9

| ID | Place name information | Position information |
|---|---|---|
| 1 | A point | $(X_a, Y_a)$ |
| 2 | B point | $(X_b, Y_b)$ |
| ⋮ | ⋮ | ⋮ |

FIG.10

INFORMATION PROCESSING APPARATUS, INFORMATION PROCESSING METHOD, AND PROGRAM

CROSS REFERENCE

This patent application is the U.S. National Phase under 35 U.S.C. § 371 of International Application No. PCT/JP2017/030489, filed on Aug. 25, 2017, which the entire content of is hereby incorporated by reference.

TECHNICAL FIELD

The present invention relates to an information processing apparatus and the like for providing map expression data.

BACKGROUND ART

Conventionally, there is a system in which geographical information can be added to a hand-written map or the like and browsed (see Patent Document 1, for example). This system is a map information system including one or more terminal apparatuses and a server apparatus, wherein each terminal apparatus includes a terminal information transmitting unit that transmits terminal information having a map identifier of a map that is being output and current position information to the server apparatus, a point information receiving unit that receives point information, which is information regarding a point on a map, from the server apparatus, and an information output unit that outputs output information, which is information corresponding to the point information, and the server apparatus includes a map information storage unit in which position correspondence information, which is a pair of absolute position information and relative position information, is stored for each map identifier, a terminal information receiving unit that receives the terminal information, a point information acquiring unit that acquires point information using the terminal information, and a point information transmitting unit that transmits the point information to the terminal apparatus.

CITATION LIST

Patent Document

Patent Document 1: JP 2011-154172A

SUMMARY OF INVENTION

Technical Problem

However, according to conventional techniques, a user has to search for map expression data of a hand-written map or the like by inputting a condition, and it is not possible to easily provide a user with appropriate map expression data.

Solution to Problem

A first aspect of the present invention is directed to an information processing apparatus including: a map expression data storage unit in which two or more pieces of map expression data expressing a map are stored, the data being associated with one or more attribute values containing region specifying information for specifying a region that is being expressed; a receiving unit that receives position specifying information for specifying a position from a terminal apparatus; a data acquiring unit that acquires one or more pieces of map expression data associated with region specifying information corresponding to a position specified with the position specifying information, from the map expression data storage unit; and a transmitting unit that transmits the one or more pieces of map expression data acquired by the data acquiring unit, to the terminal apparatus.

With this configuration, it is possible to easily provide a user with appropriate map expression data.

Furthermore, a second aspect of the present invention is directed to the information processing apparatus according to the first aspect, further including: a sorting unit that, in a case in which there are two or more pieces of map expression data acquired by the data acquiring unit, sorts the two or more pieces of map expression data, using one or more attribute values associated with each of the two or more pieces of map expression data, wherein the transmitting unit transmits the two or more pieces of map expression data sorted by the sorting unit, to the terminal apparatus.

With this configuration, it is possible to provide a user with appropriate map expression data, in an appropriate order.

Furthermore, a third aspect of the present invention is directed to the information processing apparatus according to the second aspect, further including: a score acquiring unit that, in a case in which there are two or more pieces of map expression data acquired by the data acquiring unit, acquires a score of each of the two or more pieces of map expression data, using one or at least two attribute values associated with the map expression data, wherein the sorting unit sorts the two or more pieces of map expression data, using the score as a key.

With this configuration, it is possible to easily provide a user with appropriate map expression data, in an appropriate order.

Furthermore, a fourth aspect of the present invention is directed to the information processing apparatus according to the third aspect, wherein the one or more attribute values are one or more out of a distance between position indicated by position specifying information and a representative point of map expression data, a scale factor of map expression data, an area of map expression data, and user action information regarding an action of a user to map expression data.

With this configuration, it is possible to easily provide a user with appropriate map expression data, in an appropriate order.

Furthermore, a fifth aspect of the present invention is directed to the information processing apparatus according to the fourth aspect, wherein the user action information is either history information based on an operation of a user on map expression data from the past to the present, or current information based on a current operation of a user on map expression data.

With this configuration, it is possible to easily provide a user with appropriate map expression data, in an appropriate order.

Furthermore, a sixth aspect of the present invention is directed to the information processing apparatus according to any one of the first to fifth aspects, wherein the position specifying information is any of current position information indicating a current position at which the terminal apparatus is located, position information corresponding map expression data or a map that is being output by the terminal apparatus, position information specified with place name information accepted by the terminal apparatus, map expression data or a map that is being output by the terminal apparatus, and place name information accepted by the terminal apparatus.

With this configuration, it is possible to easily provide a user with appropriate map expression data.

Furthermore, a seventh aspect of the present invention is directed to the information processing apparatus according to any one of the first to sixth aspects, further including: a second data acquiring unit that, after the receiving unit receives position specifying information, acquires one or more pieces of map expression data satisfying a predetermined condition, wherein the transmitting unit transmits part or all of the one or more pieces of map expression data acquired by the second data acquiring unit, to the terminal apparatus.

With this configuration, it is possible to easily provide a user with appropriate map expression data, without stress.

Furthermore, an eighth aspect of the present invention is directed to the information processing apparatus according to the seventh aspect, wherein the second data acquiring unit acquires one or more attribute values of map expression data transmitted by the transmitting unit to the terminal apparatus, and acquires one or more pieces of map expression data corresponding to an attribute value having a predetermined relationship with the one or more attribute values.

With this configuration, it is possible to easily provide a user with appropriate map expression data, without stress.

Furthermore, a ninth aspect of the present invention is directed to the information processing apparatus according to the seventh aspect, further including: a user information storage unit in which one or more pieces of user information having a user identifier for identifying a user and history information regarding an operation of the user on map expression data are stored, wherein the receiving unit receives a user identifier as well, and the second data acquiring unit acquires one or more pieces of map expression data, using history information paired with the user identifier received by the receiving unit.

With this configuration, it is possible to easily provide a user with appropriate map expression data, without stress.

Furthermore, a tenth aspect of the present invention is directed to the information processing apparatus according to any one of the first to ninth aspects, wherein the map expression data is contained in a file, two or more pieces of map expression data are contained in one file, the data acquiring unit acquires one or more files containing map expression data associated with region specifying information corresponding to a position specified with the position specifying information, from the map expression data storage unit, and the transmitting unit transmits the one or more files acquired by the data acquiring unit, to the terminal apparatus.

With this configuration, it is possible to easily provide a user with appropriate map expression data.

Advantageous Effects of Invention

With the information processing apparatus according to the present invention, it is possible to easily provide a user with appropriate map expression data.

BRIEF DESCRIPTION OF DRAWINGS

FIG. 8 shows a map expression data management table in this embodiment.

FIG. 9 shows a user information management table in this embodiment.

FIG. 10 shows a place name/position correspondence table in this embodiment.

DESCRIPTION OF EMBODIMENT

Figure 1:
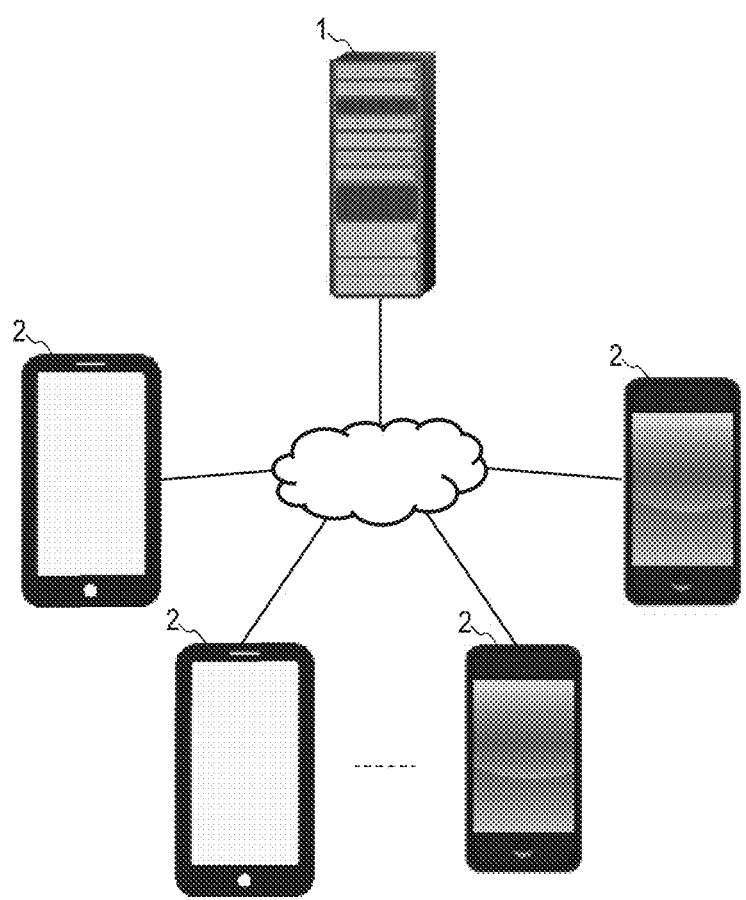
FIG. 1 is a conceptual diagram of an information system A in Embodiment 1.

Hereinafter, an embodiment of an information processing apparatus and the like will be described with reference to the drawings. It should be noted that constituent elements denoted by the same reference numerals in the embodiments perform similar operations, and thus a description thereof may not be repeated.

Embodiment 1

In this embodiment, an information system for searching for map expression data with which region specifying information for specifying a region is associated, using position specifying information for specifying a position will be described.

Furthermore, in this embodiment, an information system sorting and outputting multiple pieces of map expression data that have been searched for and acquired will be described.

Furthermore, in this embodiment, an information system capable of caching map expression data that satisfies a predetermined condition, on a terminal apparatus that is being used by a user will be described.

Moreover, in this embodiment, an information system capable of processing one file containing two or more pieces of map expression data will be described.

FIG. 1 is a conceptual diagram of an information system A in this embodiment. The information system A includes an information processing apparatus 1 and one or at least two terminal apparatuses 2. The information processing apparatus 1 is a so-called server apparatus, such as a cloud server or an ASP server, and there is no limitation on the type thereof. Each terminal apparatus 2 is a terminal that is used by a user, such as a so-called smartphone, tablet device, laptop, or PC, and there is no limitation on the type thereof.

Figure 2:
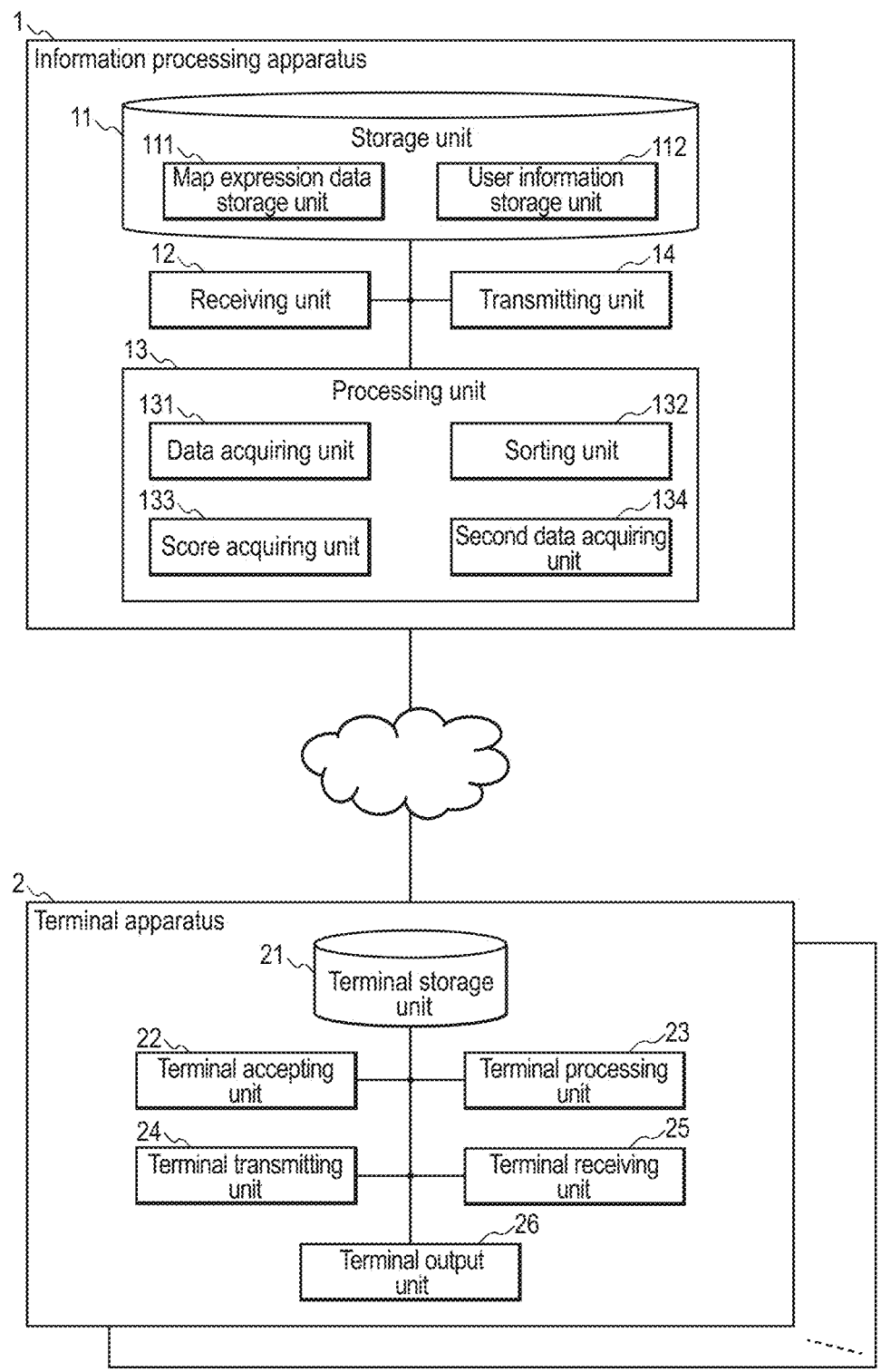
FIG. 2 is a block diagram of the information system A in this embodiment.

FIG. 2 is a block diagram of the information system A in this embodiment.

The information processing apparatus 1 includes a storage unit 11, a receiving unit 12, a processing unit 13, and a transmitting unit 14. The storage unit 11 includes a map expression data storage unit 111 and a user information storage unit 112. The processing unit 13 includes a data acquiring unit 131, a sorting unit 132, a score acquiring unit 133, and a second data acquiring unit 134.

The terminal apparatus 2 includes a terminal storage unit 21, a terminal accepting unit 22, a terminal processing unit 23, a terminal transmitting unit 24, a terminal receiving unit 25, and a terminal output unit 26.

In the storage unit 11 constituting the information processing apparatus 1, various types of information are stored. The various types of information are, for example, later-described map expression data, later-described user information, or information consisting of a pair of place name information and position information. The place name information is information indicating a place name, and is, for example, a name of a place, a name of a point, a name of a scenic spot, a name of a station, a name of a landscape, a name of a prefecture, a name of a city, a name of a tourist attraction, or the like. The position information is information indicating a position, typical examples of which include (latitude, longitude), and is any information as long as it is information indicating a position.

Furthermore, the various types of information are, for example, an operation expression for calculating a later-described score, or a score table for acquiring a score. The operation expression is, for example, an expression using, as parameters, one or more attribute values of map expression data, and specific examples thereof include will be described later. The score table is a table in which a score or base data based on which a score is obtained is stored so as to be paired with each of one or more attribute values or a combination of attribute values of map expression data.

Furthermore, the various types of information are, for example, a place name/position correspondence table. The place name/position correspondence table is a table indicating correspondence between place name information and position information.

In the map expression data storage unit 111, two or more pieces of map expression data are stored. The map expression data is data expressing a map. The map expression data is information in which a geographical region expressed is limited. The map expression data is preferably associated with a map identifier for identifying map expression data. The map identifier is, for example, an ID, a name of a file containing map expression data, a name of map expression data, or the like. The map expression data is, for example, an old map, an illustrated map, a sketch map, a hand-written map, or the like, but there is no limitation on the type thereof. The map expression data is typically image data, but may also be vector data or the like, and there is no limitation on the data structure thereof. The map expression data is associated with one or at least two attribute values. The one or more attribute values are attribute values of map expression data. The attribute values are information indicating properties or features of map expression data, or the like. The one or more attribute values associated with the map expression data contain region specifying information. The region specifying information is information for specifying a region represented by the map expression data. The region is typically in the shape of a rectangle, but may be in the shape other than a rectangle, such as a triangle, an octagon, a circle, or the like. The region represented by map expression data may also be said to be a region expressed by map expression data.

The one or more attribute values associated with the map expression data are, for example, static attribute values, which are attribute values that are static. The one or more attribute values associated with the map expression data are, for example, dynamic attribute values that dynamically change. The one or more attribute values may include one or more static attribute values and one or more dynamic attribute values. The static attribute values are, for example, a scale factor of map expression data as a map (simply referred to as a "scale factor" as appropriate), an area of implementation of a region indicated by map expression data, on a map (simply referred to as an "area" as appropriate), or content information indicating the content of a map. The content information is a completion level of map expression data, a theme of map expression data, metadata or a keyword corresponding to map expression data, or the like. The metadata or keyword is, for example, the type of map expression data, a name or a landscape or place that is in a region in map expression data, or the like. The dynamic attribute values are, for example, a distance between position indicated by position specifying information and a representative point of map expression data, or user action information regarding an action of a user to map expression data.

The representative point of map expression data is, for example, a center of gravity of map expression data, any point at an end of map expression data, or any point constituting a boundary of a region in map expression data.

It is preferable that the map expression data is contained in a file. Note that the map expression data may also be data in a database, and there is no limitation on the data format, and management method. If the map expression data is contained in a file, two or more pieces of map expression data may be contained in the file. It is also possible that one piece of map expression data is realized by two or more files. That is to say, it is also possible that one piece of map expression data is divided into two or more files.

The user action information typically contains one or more types of information out of history information and current information. The history information is information based on an operation of a user on map expression data from the past to the present. The current information is information based on a current operation of a user on map expression data. The history information is, for example, the number of downloads by users in the past, the number of views per month, an average access time, the number of stars, an average of evaluation values from users such as a rank, or the number of comments from users to map expression data (the number of feedbacks). Note that the history information may also be, for example, an instruction from a user (e.g., a download instruction, or an instruction that is not displayed on the terminal apparatus 2), a received comment, a received evaluation value, or the like.

The current information is, for example, that is currently being output by the terminal apparatus 2, a map identifier for identifying map expression data, or an output time period (which may also be said to be a browsing time) of map expression data that is currently being output.

In the user information storage unit 112, one or at least two pieces of user information are stored. The user information is information regarding a user. The user information typically has a user identifier for identifying a user and history information. The history information is information regarding a history of an operation of the user on map expression data. The history information is, for example, a map identifier for identifying map expression data browsed (downloaded), a time period during which map expression data is browsed, or the like. Note that the user identifier may also be a terminal identifier for identifying the terminal apparatus 2. The user identifier is, for example, an ID, an e-mail address, a telephone number, a MAC address, or the like.

The receiving unit 12 receives position specifying information from the terminal apparatus 2. It is preferable that the receiving unit 12 receives a user identifier as well, in association with the position specifying information.

Note that the position specifying information is information for specifying a position. The position specifying information may also be information for specifying a position of the terminal apparatus 2, information for specifying a position of a region or an area that seems to be currently being focused on by a user, or the like. the position specifying information is, for example, current position information indicating a current position at which the terminal apparatus 2 is located (e.g., information (latitude, longitude)), position information corresponding map expression data or a map that is being output by the terminal apparatus 2, position information specified with place name information accepted by the terminal apparatus 2, map expression data or a map that is being output by the terminal apparatus 2, or place name information accepted by the terminal apparatus 2.

The position information corresponding map expression data or a map that is being output by the terminal apparatus 2 is information indicating a position of a center of map expression data or a map that is being output by the terminal apparatus 2, information indicating a position of any one point on a boundary line of map expression data or a map that is being output by the terminal apparatus 2, or the like.

The processing unit 13 performs various types of processing. The various types of processing are, for example, processes that are performed by the data acquiring unit 131, the sorting unit 132, the score acquiring unit 133, or the second data acquiring unit 134.

The data acquiring unit 131 acquires one or at least two pieces of map expression data associated with region specifying information corresponding to a position specified with the position specifying information, from the map expression data storage unit 111. The region specifying information corresponding to a position specified with the position specifying information is, for example, region specifying information indicating a region containing a position specified with the position specifying information, region specifying information indicating a region containing a position that is close to a position specified with the position specifying information enough to satisfy a predetermined condition, or the like.

If the map expression data is contained in a file, the data acquiring unit 131 acquires one or more files containing map expression data associated with region specifying information corresponding to a position specified with the position specifying information, from the map expression data storage unit 111. Note that the state in which the map expression data is contained in a file may also be a state in which the map expression data is a file. The state in which the map expression data is a file is, for example, a state in which the file is an image file of the map expression data.

If there are two or more pieces of map expression data acquired by the data acquiring unit 131, the sorting unit 132 sorts the two or more pieces of map expression data, using one or more attribute values associated with each of the two or more pieces of map expression data. That is to say, if there are two or more pieces of map expression data acquired by the data acquiring unit 131, the sorting unit 132 acquires one or more attribute values associated with each of the two or more pieces of map expression data, from the map expression data storage unit 111, and sorts the two or more pieces of map expression data, using the one or more attribute values.

The sorting unit 132 sorts the two or more pieces of map expression data, for example, using a score as a key, the score being acquired from each of the one or more attribute values associated with the map expression data. Note that the score is acquired by a later described score acquiring unit 133. The sorting is typically sorting in descending order of scores. The sorting unit 132 typically sorts map expression data such that data with a higher score is output first (earlier). The sorting may be any processing in which data is sequentially output by the terminal apparatus 2, and, for example, it may be re-ordering two or more pieces of map expression data, or adding order information indicating the order to two or more pieces of map expression data, in association with each piece of map expression data.

If there are two or more pieces of map expression data acquired by the data acquiring unit 131, the score acquiring unit 133 acquires a score of each of the two or more pieces of map expression data, using one or at least two attribute values associated with the map expression data. Various algorithms may be used to acquire scores.

The score acquiring unit 133 may acquire a score of each piece of map expression data, using only one or more attribute values associated with the map expression data. The score acquiring unit 133 may acquire a score of each piece of map expression data, using one or more attribute values associated with the map expression data, and user information.

The score acquiring unit 133 acquires, for example, a score of map expression data, using one or at least two attribute values out of a distance between position indicated by position specifying information and a representative point of map expression data (hereinafter, simply referred to as a "distance" as appropriate), a scale factor, an area, a completion level, metadata, the number of DLs, the number of views per month, an average access time, and an evaluation value. The scale factor is a scale factor of map expression data. The area is the actual area of a region in which map expression data is expressed. The completion level is information indicating the level at which map expression data is completed, and is information input by a person. The metadata is information that is given to map expression data. The number of DLs is the total number of times that data is downloaded to one or more terminal apparatuses 2 to the present, and displayed on the one or more terminal apparatuses 2. Note that the number of DLs may also be the total number of times that data is downloaded to one or more terminal apparatuses 2 to the present. The number of views per month is the total number of times that data is displayed on one or more terminal apparatuses 2 in that month or the previous month. The average access time is an average of time periods during which data is displayed on terminal apparatuses 2. The evaluation value is an average of evaluation values from users.

The score acquiring unit 133 calculates, for example, a score such that the smaller the distance is, the larger the score is. The score acquiring unit 133 calculates, for example, a score such that the smaller the scale factor is, the larger the score is. The score acquiring unit 133 calculates, for example, a score such that the smaller the area is, the larger the score is. The score acquiring unit 133 calculates, for example, a score such that the higher the completion level is (the larger the value of the completion level is), the larger the score is. The score acquiring unit 133 calculates, for example, a score such that the larger the number of DLs is, the larger the score is. The score acquiring unit 133 calculates, for example, a score such that the larger the number of views per month, the larger the score is. The score acquiring unit 133 calculates, for example, a score such that the longer the average access time is, the larger the score is. The score acquiring unit 133 calculates, for example, a score such that the larger the evaluation value is, the larger the score is.

The score acquiring unit 133 may, for example, refer to a score table in which the score is determined if one or at least two attribute values are determined, and acquire a score from the score table using the acquired one or at least two attribute values.

After the receiving unit 12 receives position specifying information, the second data acquiring unit 134 acquires one or more pieces of map expression data satisfying a predetermined condition (hereinafter, referred to as a "cache condition" as appropriate). The second data acquiring unit 134 acquires map expression data for cache in order to increase the speed of map expression data display on the terminal apparatus 2. That is to say, it is preferable that the second data acquiring unit 134 acquires map expression data that is estimated to be highly likely to be requested next by a user of the terminal apparatus 2 (that satisfies a predetermined condition).

The second data acquiring unit 134 acquires, for example, one or more attribute values of map expression data that has been transmitted by the transmitting unit 14 to the terminal apparatus 2 (map expression data that is currently being browsed), and acquires one or more pieces of map expression data corresponding to an attribute value having a predetermined relationship with the one or more attribute values. Note that the attribute value having a predetermined relationship is, for example, one or more attribute values that match one or more attribute values of map expression data that is currently being browsed. The attribute value having a predetermined relationship is, for example, one or more attribute values that are close to one or more attribute values of map expression data that is currently being browsed enough to satisfy a predetermined condition.

The second data acquiring unit 134 acquires, for example, one or more pieces of map expression data, using history information paired with the user identifier received by the receiving unit 12. The second data acquiring unit 134 acquires, for example, s one or more attribute values paired with one or more map identifiers contained in history information, acquires attribute values satisfying a cache condition out of the acquire attribute values (acquires attribute values preferred by the user), and acquires one or more pieces of map expression data paired with the attribute values.

The second data acquiring unit 134 acquires, for example, one or more pieces of map expression data, using the one or more attribute values of map expression data that has been transmitted by the transmitting unit 14 to the terminal apparatus 2 (map expression data that is currently being browsed), and the history information paired with the user identifier received by the receiving unit 12.

The second data acquiring unit 134 acquires, for example, one or more pieces of map expression data in which the score acquired by the score acquiring unit 133 is large enough to satisfy a predetermined condition. Note that, in this case, the score acquiring unit 133 acquires a score of map expression data, using one or more types of attribute values out of the one or more attribute values of map expression data that has been transmitted by the transmitting unit 14 to the terminal apparatus 2 (map expression data that is currently being browsed) and the history information paired with the user identifier received by the receiving unit 12.

There is no limitation on the time at which the second data acquiring unit 134 acquires map expression data that is to be cached by one terminal apparatus 2. For example, in a case in which map expression data is transmitted to one terminal apparatus 2, the second data acquiring unit 134 may start a process that acquires map expression data that is to be cached by the one terminal apparatus 2. For example, in a case in which a predetermined time period has elapsed after map expression data is transmitted to one terminal apparatus 2, the second data acquiring unit 134 may start a process that acquires map expression data that is to be cached by the one terminal apparatus 2.

The transmitting unit 14 transmits the one or more pieces of map expression data acquired by the data acquiring unit 131, to the terminal apparatus 2. If the transmitting unit 14 transmits one piece of map expression data, the one piece of map expression data may also be two or more files. The transmitting unit 14 may perform transmission to the terminal apparatus 2 such that multiple files constituting one piece of map expression data (files each constituting part of the map expression data) are put together into one and transmitted in the form of a compressed file, or multiple files associated with one ID are transmitted at different times through asynchronous communication. Note that a file constituting part of one piece of map expression data may also be said to be a tile image file. Also, multiple files constituting one piece of map expression data may also be said to be a data set.

The transmitting unit 14 transmits, for example, the two or more pieces of map expression data sorted by the sorting unit 132, to the terminal apparatus 2.

The transmitting unit 14 transmits, for example, part or all of the one or more pieces of map expression data acquired by the second data acquiring unit 134, to the terminal apparatus 2. Part of the map expression data is map expression data in a partial region obtained by dividing the map expression data. The map expression data in a partial region may also be said to be partial map expression data.

The transmitting unit 14 transmits, for example, the one or more files acquired by the data acquiring unit 131, to the terminal apparatus 2. Note that, in this case, the files contain one or at least two pieces of map expression data.

In the terminal storage unit 21 constituting the terminal apparatus 2, various types of information are stored. The various types of information are, for example, a user identifier, or the whole or part of the map expression data that has been cached. The various types of information are, for example, place name/position correspondence table.

The terminal accepting unit 22 accepts various types of instructions or information. The various types of instructions or information are, for example, an instruction to request map expression data, or various operations. The instruction to request map expression data may or may not have a map identifier.

In this example, the accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The various types of instructions or information may be input by any part such as a touch panel, a keyboard, a mouse, a menu screen, or the like. The terminal accepting unit 22 may be realized by a device driver for an input part such as a touch panel or a keyboard, software for controlling a menu screen, or the like.

The terminal processing unit 23 performs various types of processing. The various types of processing are, for example, a process that configures an instruction that is to be transmitted, from the instruction accepted by the terminal accepting unit 22. If the terminal accepting unit 22 accepts an instruction to request map expression data, and the instruction to request does not have a map identifier, for example, the terminal processing unit 23 acquires position information indicating the current position, acquires a user identifier from the terminal storage unit 21, and configures information having position specifying information having the position information and the user identifier. If the terminal accepting unit 22 accepts an instruction to request map expression data, the instruction to request does not have a map identifier, and a map or map expression data is displayed on the terminal apparatus 2, for example, the terminal processing unit 23 acquires position information of a representative point of a region in the displayed map or position information of a representative point of a region in the displayed map expression data, acquires a user identifier from the terminal storage unit 21, and configures information having position specifying information having the position information and the user identifier. If the terminal accepting unit 22 accepts an instruction to request map expression data, the instruction to request does not have a map identifier, and a map or map expression data is displayed on the terminal apparatus 2, for example, the terminal processing unit 23 acquires the displayed map or the displayed map expression data, acquires a user identifier from the terminal storage unit 21, and configures information having the map or map expression data and the user identifier. If the terminal accepting unit 22 accepts an instruction to request map expression data, and the request instruction has point information, for example, the terminal processing unit 23 acquires a user identifier from the terminal storage unit 21, and configures information having position specifying information having the point information and the user identifier. If the terminal accepting unit 22 accepts an instruction to request map expression data, and the request instruction has point information, for example, the terminal processing unit 23 acquires a user identifier from the terminal storage unit 21, acquires position information corresponding the point information from the place name/position correspondence table in the terminal storage unit 21, and configures information having position specifying information having the position information and the user identifier.

The various types of processing are, for example, a process that acquires position information paired with the accepted place name information from the place name/position correspondence table in the terminal storage unit 21.

The various types of processing are, for example, a process that temporarily stores the whole or part of the map expression data received for cache, in an unshown buffer.

The terminal transmitting unit 24 transmits various types of instructions or information to the information processing apparatus 1. The terminal transmitting unit 24 transmits the information configured by the terminal processing unit 23, to the information processing apparatus 1.

The terminal receiving unit 25 receives various types of information from the information processing apparatus 1. The various types of information are map expression data that is to be output. The various types of information are the whole or part of map expression data that is to be cached.

The terminal output unit 26 outputs various types of information. The various types of information are information accepted by the terminal accepting unit 22, map expression data received by the terminal receiving unit 25, or the like.

In this example, the output is typically display on a display screen. Note that the output may be considered as a concept that encompasses projection using a projector, printing by a printer, transmission to an external apparatus (typically a display apparatus), delivery of a processing result to another processing apparatus or another program, and the like.

The storage unit 11, the map expression data storage unit 111, the user information storage unit 112, and the terminal storage unit 21 are preferably non-volatile storage media, but can also be realized by volatile storage media.

There is no limitation on the procedure in which information is stored in the storage unit 11 and the like. For example, information may be stored in the storage unit 11 and the like via a storage medium, information transmitted via a communication line or the like may be stored in the storage unit 11 and the like, or information input via an input device may be stored in the storage unit 11 and the like.

The receiving unit 12 and the terminal receiving unit 25 are typically realized by a wireless or wired communication part, but can also be realized by a broadcast receiving part.

The processing unit 13, the data acquiring unit 131, the sorting unit 132, the score acquiring unit 133, the second data acquiring unit 134, and the terminal processing unit 23 may be realized typically by MPUs, memories, or the like. Typically the processing procedure of the processing unit 13 and the like is realized by software, and the software is stored in a storage medium such as a ROM. Note that the processing procedure may be realized also by hardware (dedicated circuits).

The transmitting unit 14 and the terminal transmitting unit 24 are typically realized by a wireless or wired communication part, but can also be realized by a broadcasting part.

The terminal output unit 26 may be considered to include or to not include an output device such as a display screen or a speaker. The terminal output unit 26 may be realized by driver software for an output device, a combination of driver software for an output device and the output device, or the like.

Next, an operation of the information system A will be described. First, an operation of the information processing apparatus 1 will be described with reference to the flowcharts in FIGS. 3 and 4.

(Step S301) The receiving unit 12 judges whether or not it has received position specifying information from the terminal apparatus 2. If it has received position specifying information, the procedure advances to step S302, and, if otherwise, the procedure advances to step S313. Note that the receiving unit 12 typically receives a user identifier associated with the position specifying information as well.

(Step S302) The data acquiring unit 131 acquires position information, using the position specifying information received in step S301. Note that the position information acquiring processing will be described with reference to the flowchart in FIG. 5.

(Step S303) The data acquiring unit 131 substitutes 1 for a counter i.

(Step S304) The data acquiring unit 131 judges whether or not there is an $i^{-th}$ piece of map expression data in the map expression data storage unit 111. If there is an $i^{-th}$ piece of map expression data, the procedure advances to step S305, and, if otherwise, the procedure advances to step S309.

(Step S305) The data acquiring unit 131 acquires region specifying information paired with the $i^{-th}$ piece of map expression data, from the map expression data storage unit 111.

(Step S306) The data acquiring unit 131 judges whether or not the position information acquired in step S302 matches the region specifying information acquired in step S305. If the position information matches the region specifying information, the procedure advances to step S307, and, if otherwise, the procedure advances to step S308. Note that a state in which the position information matches the region specifying information is, for example, a state in which a point specified with the position information is contained in a region indicated by the region specifying information, a state in which a point specified with the position information is close to a region indicated by the region specifying information enough to satisfy a predetermined condition, or the like. Note that the position information acquired in step S302 is position information is stored in a later-described variable.

(Step S307) The data acquiring unit 131 acquires a map identifier for identifying the $i^{-th}$ piece of map expression data, from the map expression data storage unit 111, and temporarily stores it in an unshown buffer.

(Step S308) The data acquiring unit 131 increments the counter i by 1. The procedure returns to step S304.

(Step S309) The sorting unit 132 judges whether or not there are two or more map identifiers in an unshown buffer. If there are two or more map identifiers, the procedure advances to step S310, and, if otherwise, the procedure advances to step S311.

(Step S310) The sorting unit 132 sorts two or more pieces of map expression data identified with the two or more map identifiers in the unshown buffer. The sorting processing will be described with reference to the flowchart in FIG. 6.

(Step S311) The processing unit 13 acquires a map identifier in the unshown buffer, and acquires map expression data identified with the map identifier, from the map expression data storage unit 111.

(Step S312) The transmitting unit 14 transmits the one or more pieces of map expression data acquired in step S310 or S311, to the terminal apparatus 2. The procedure returns to step S301.

(Step S313) The second data acquiring unit 134 judges whether or not to transmit map expression data that is to be cached by one terminal apparatus 2. If it is judged to transmit map expression data that is to be cached, the procedure advances to step S314, and, if otherwise, the procedure advances to step S324. Note that the case in which it is judged to transmit map expression data that is to be cached is, for example, a case in which map expression data is transmitted to one terminal apparatus 2, or a case in which a predetermined time period has elapsed after map expression data is transmitted to one terminal apparatus 2.

(Step S314) The second data acquiring unit 134 acquires history information paired with the user identifier of the terminal apparatus 2 to which map expression data for cache is to be transmitted, from the user information storage unit 112.

(Step S315) The second data acquiring unit 134 substitutes 1 for a counter j.

(Step S316) The second data acquiring unit 134 judges whether or not there is a $j^{-th}$ piece of map expression data in the map expression data storage unit 111. If there is a $j^{-th}$ piece of map expression data, the procedure advances to step S317, and, if otherwise, the procedure advances to step S321.

(Step S317) The second data acquiring unit 134 acquires one or more attribute values paired with the $j^{-th}$ piece of map expression data, from the map expression data storage unit 111.

(Step S318) The second data acquiring unit 134 judges whether or not the one or more attribute values acquired in step S317, the history information acquired in step S314, or the one or more attribute values acquired in step S317 and the history information acquired in step S314 match a cache condition. If the cache condition is matched, the procedure advances to step S319, and, if otherwise, the procedure advances to step S320.

(Step S319) The second data acquiring unit 134 temporarily stores a map identifier for identifying the $j^{-th}$ piece of map expression data, in an unshown buffer. Note that the score acquiring unit 133 may calculate a score as described above for the $j^{-th}$ piece of map expression data, and temporarily store the map identifier in an unshown buffer so as to be paired with the score. The map identifier that is temporarily stored in a buffer is typically an identifier of map expression data that is a candidate for map expression data that is to be cached. An example of a method for the score acquiring unit 133 to calculate a score is as described above.

(Step S320) The second data acquiring unit 134 increments the counter j by 1. The procedure returns to step S316.

(Step S321) The second data acquiring unit 134 decides on map expression data that is to be cached by the terminal apparatus 2, out of the map expression data identified with the map identifiers accumulated in the unshown buffer. Note that the second data acquiring unit 134 may decide on all pieces of map expression data identified with the map identifiers accumulated in the unshown buffer, as map expression data that is to be cached. The second data acquiring unit 134 may select one map identifier at random out of the map expression data identified with the map identifiers accumulated in the unshown buffer, and decide on all pieces of map expression data identified with the one map identifier, as map expression data that is to be cached. It is also possible that map expression data in which the score accumulated in the unshown buffer is in the top N (N is a natural number of 1 or more) is decided on as map expression data that is to be cached. It is also possible that map expression data in which the score accumulated in the unshown buffer is greater than or equal to a threshold is decided on as map expression data that is to be cached. Note that the deciding on map expression data may be, for example, providing a map identifier, giving a flag to map expression data, or the like.

(Step S322) The second data acquiring unit 134 acquires the one or more pieces of map expression data decided on in step S321, from the map expression data storage unit 111.

(Step S323) The transmitting unit 14 transmits all of the one or more pieces of map expression data acquired in step S322 or part of each of the one or more pieces of map expression data acquired in step S322, to one terminal apparatus 2 judged as an apparatus that is to cache the data. The procedure returns to step S301.

(Step S324) The receiving unit 12 judges whether or not it has received operation information or the like from the terminal apparatus 2. If it has received operation information or the like, the procedure advances to step S325, and, if otherwise, the procedure returns to step S301. Note that the operation information or the like is, for example, operation information and a user identifier.

(Step S325) The processing unit 13 accumulates the operation information or the like received in step S324, in the user information storage unit 112. The procedure returns to step S301.

Figure 3:
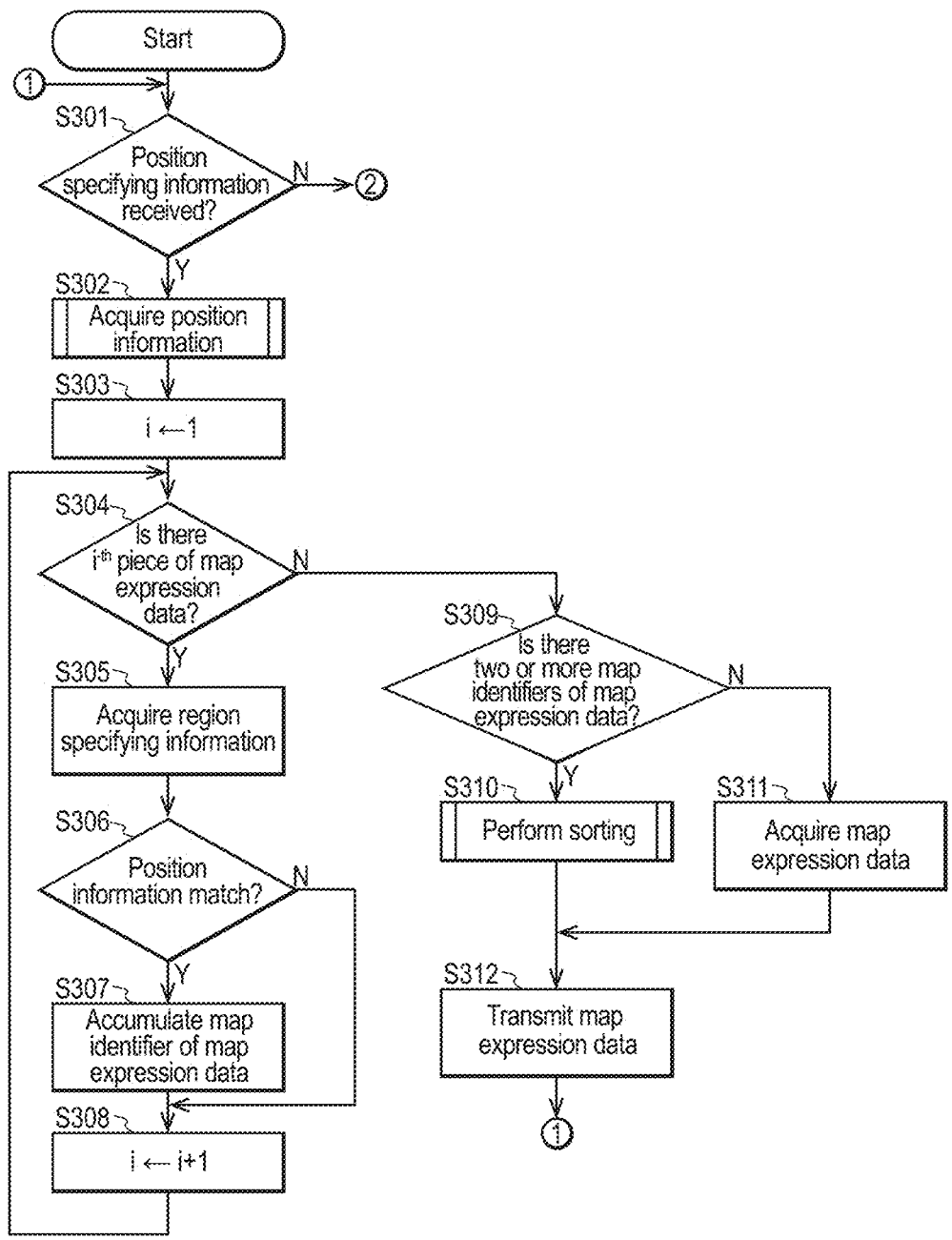
FIG. 3 is a flowchart illustrating an operation of an information processing apparatus 1 in this embodiment.
Figure 4:
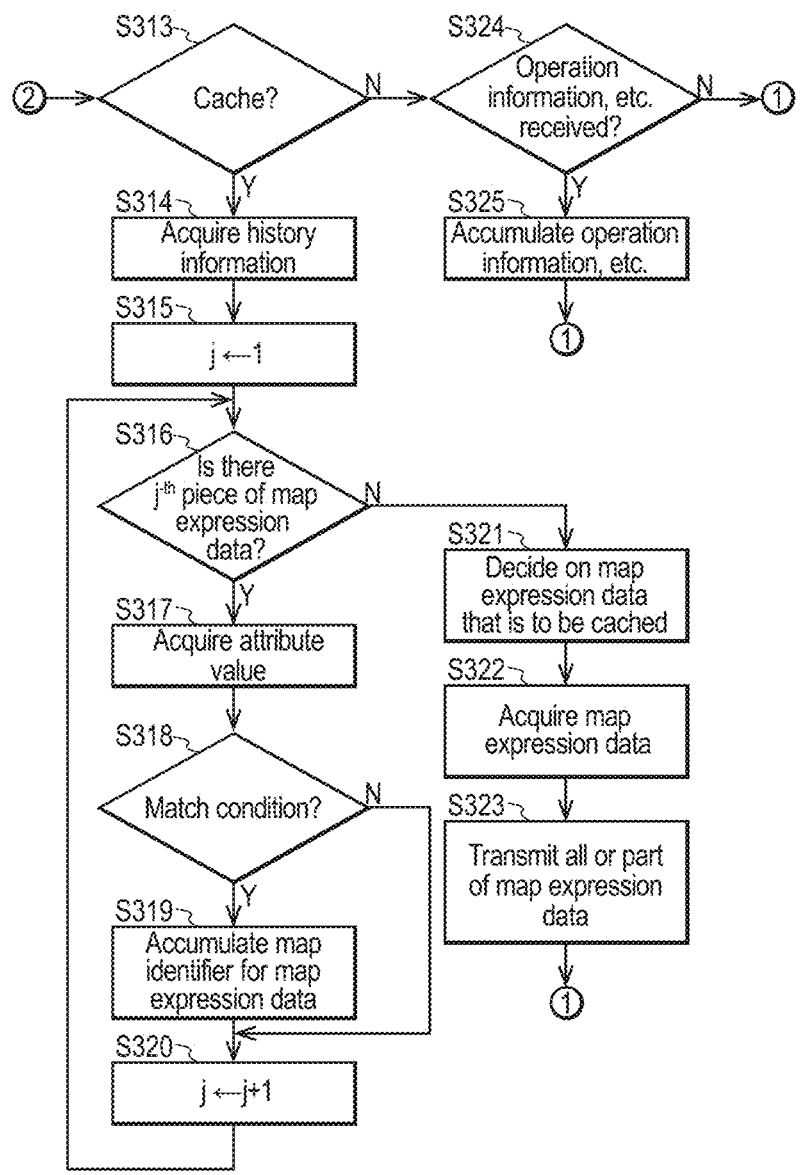
FIG. 4 is a flowchart illustrating an operation of the information processing apparatus 1 in this embodiment.
Figure 5:
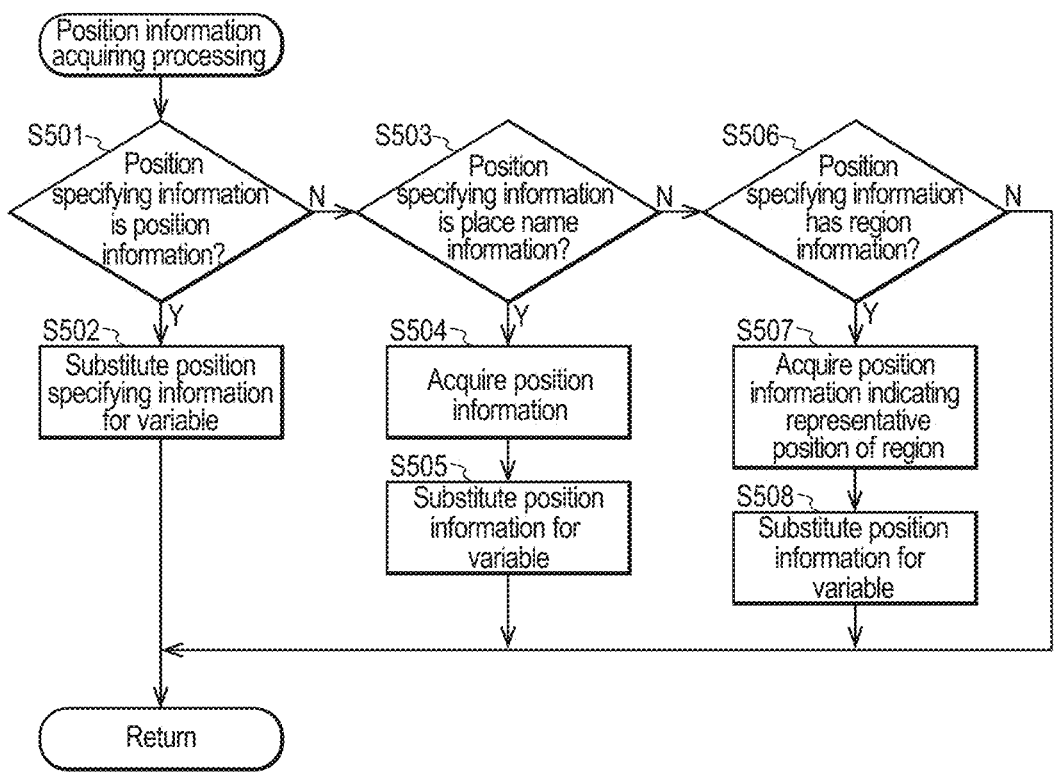
FIG. 5 is a flowchart illustrating position information acquiring processing in this embodiment.

In the flowcharts in FIGS. 3 and 4, processing ends at power off or at an interruption of ending processing Next, the position information acquiring processing in step S302 will be described with reference to the flowchart in FIG. 5.

(Step S501) The data acquiring unit 131 judges whether or not the position specifying information received in step S301 is position information itself. If it is position information itself, the procedure advances to step S502, and, if otherwise, the procedure advances to step S503.

(Step S502) The data acquiring unit 131 substitutes the position specifying information received in step S301 for a variable in which position information is stored. The procedure returns to the upper-level processing.

(Step S503) The data acquiring unit 131 judges whether or not the position specifying information received in step S301 is place name information. If it is place name information, the procedure advances to step S504, and, if otherwise, the procedure advances to step S506.

(Step S504) The data acquiring unit 131 acquires position information corresponding the place name information received in step S301, from the storage unit 11.

(Step S505) The data acquiring unit 131 substitutes the position information acquired in step S504 for a variable in which position information is stored. The procedure returns to the upper-level processing.

(Step S506) The data acquiring unit 131 judges whether or not the position specifying information received in step S301 contains region information indicating a region, or region information (e.g., map expression data, a map, or a map identifier) corresponding to the position specifying information received in step S301 is stored in the map expression data storage unit 111. If the information has region information or the like, the procedure advances to step S507, and, if otherwise, the procedure returns to the upper-level processing.

(Step S507) The data acquiring unit 131 acquires position information indicating a representative position of a region indicated by the region information contained in the position specifying information received in step S301, or acquires position information indicating a representative position of a region indicated by the region information corresponding to the position specifying information received in step S301. Note that the position information indicating a representative position of a region is, for example, position information indicating the position of the center of gravity of the region.

(Step S508) The data acquiring unit 131 substitutes the position information acquired in step S507 for a variable in which position information is stored. The procedure returns to the upper-level processing.

Figure 6:
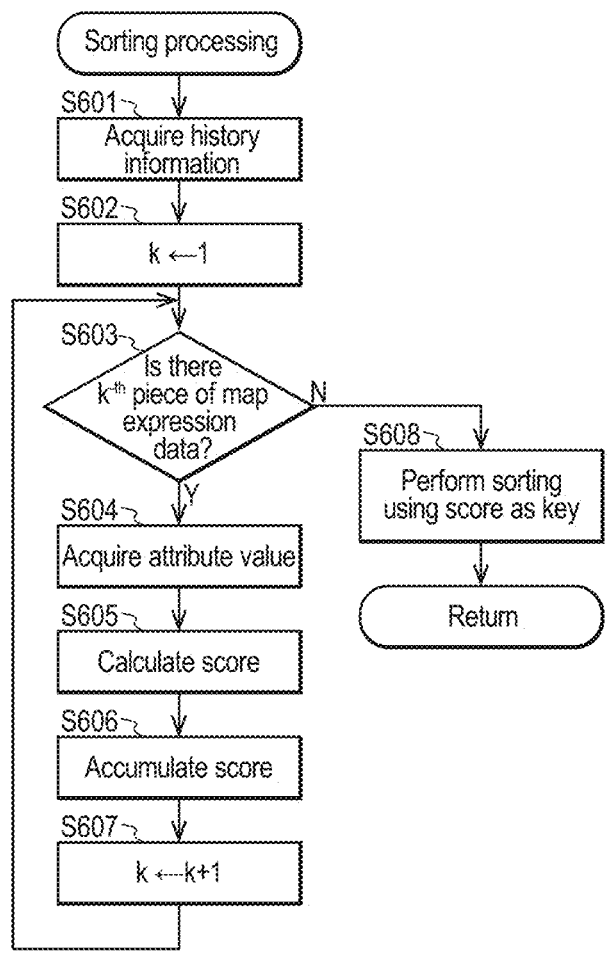
FIG. 6 is a flowchart illustrating sorting processing in this embodiment.

Next, the sorting processing in step S310 will be described with reference to the flowchart in FIG. 6.

(Step S601) The score acquiring unit 133 acquires history information paired with a user identifier of a user of the terminal apparatus 2 from which the, position specifying information was transmitted, from the user information storage unit 112.

(Step S602) The score acquiring unit 133 substitutes 1 for a counter k.

(Step S603) The score acquiring unit 133 judges whether or not there is a $k^{-th}$ map identifier in an unshown buffer. If there is a $k^{-th}$ map identifier, the procedure advances to step S604, and, if otherwise, the procedure advances to step S608. Note that the state in which there is a $k^{-th}$ map identifier is a state in which there is a $k^{-th}$ piece of map expression data.

(Step S604) The score acquiring unit 133 acquires one or more attribute values paired with the $k^{-th}$ piece of map expression data, from the map expression data storage unit 111.

(Step S605) The score acquiring unit 133 calculates a score for the $k^{-th}$ piece of map expression data, using the one or more attribute values acquired in step S604 or/and the history information acquired in step S601.

(Step S606) The score acquiring unit 133 accumulates the score calculated in step S605 in an unshown buffer in association with the $k^{-th}$ map identifier.

(Step S607) The score acquiring unit 133 increments the counter k by 1. The procedure returns to step S603.

(Step S608) The sorting unit 132 sorts map identifiers in descending order of the scores in the unshown buffer. The sorting unit 132 acquires map expression data identified with the map identifiers, in the sorting order, from the map expression data storage unit 111. The procedure returns to the upper-level processing.

Figure 7:
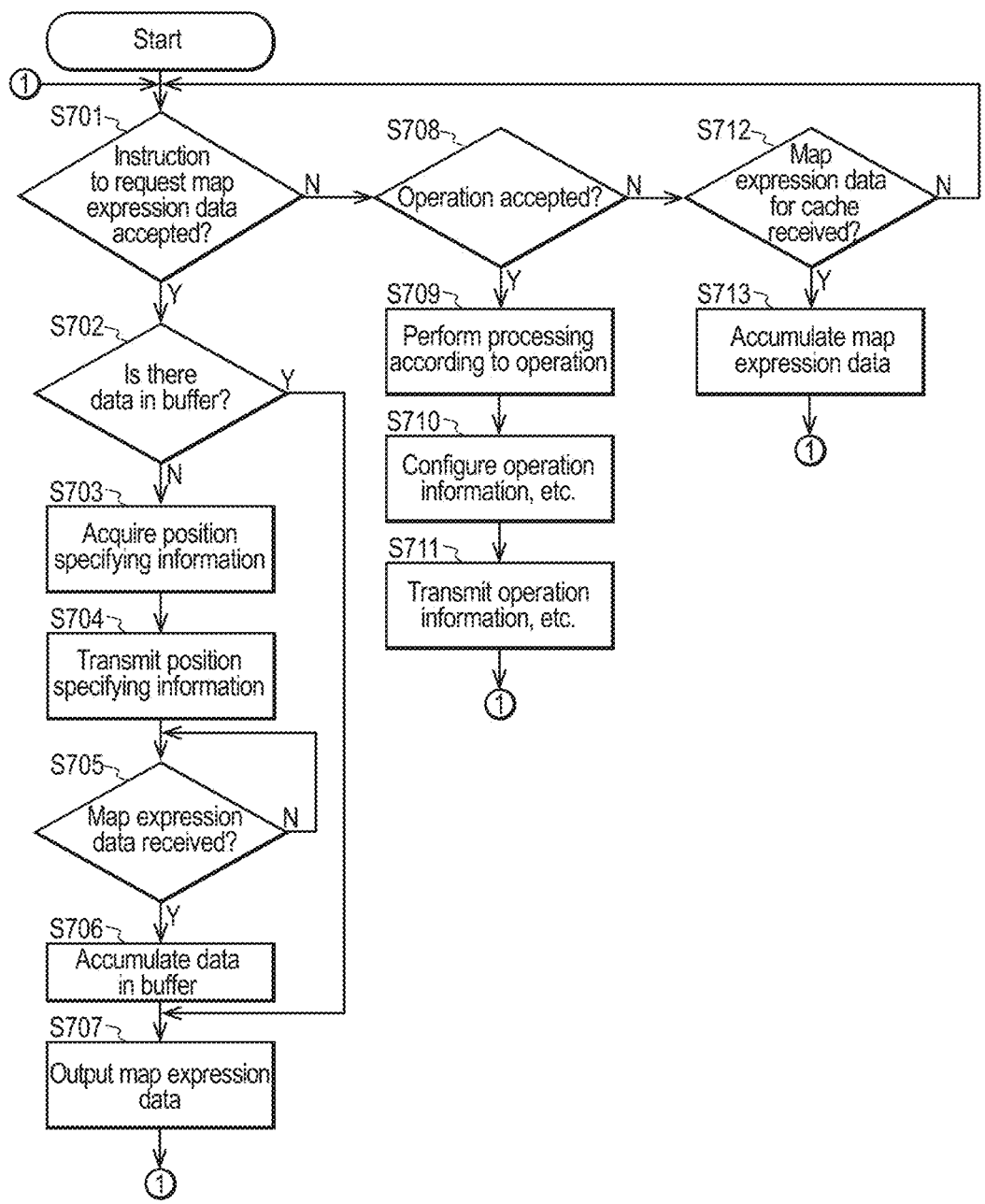
FIG. 7 is a flowchart illustrating an operation of a terminal apparatus 2 in this embodiment.

Next, an operation the terminal apparatus 2 will be described with reference to the flowchart in FIG. 7.

(Step S701) The terminal accepting unit 22 judges whether or not it has accepted an instruction to request map expression data. If it has accepted a request instruction, the procedure advances to step S702, and, if otherwise, the procedure advances to step S708.

(Step S702) The terminal processing unit 23 judges whether or not map expression data corresponding to the request instruction accepted in step S701 has been cached in an unshown buffer. If the map expression data has been cached, the procedure advances to step S707, and, if otherwise, the procedure advances to step S703.

(Step S703) The terminal processing unit 23 acquires position specifying information corresponding to the request instruction accepted in step S701. The terminal processing unit 23 acquires, for example, a user identifier from the terminal storage unit 21 and configures information having the position specifying information and the user identifier.

(Step S704) The terminal transmitting unit 24 transmits the information configured in step S703 to the information processing apparatus 1, the information containing the position specifying information.

(Step S705) The terminal receiving unit 25 judges whether or not it has received one or at least two pieces of map expression data from the information processing apparatus 1. If it has received map expression data, the procedure advances to step S706, and, if otherwise, the procedure returns to step S705.

(Step S706) The terminal processing unit 23 accumulates the one or more pieces of map expression data received in step S705 in an unshown buffer.

(Step S707) The terminal output unit 26 outputs the map expression data in the buffer. The procedure returns to step S701. Note that, in this example, if there are multiple pieces of map expression data that are candidates for data that is to be output, the multiple pieces of map expression data may be output, or only the first map expression data in the sorting order may be output.

(Step S708) The terminal accepting unit 22 judges whether or not it has accepted an operation from a user. If it has accepted an operation, the procedure advances to step S709, and, if otherwise, the procedure advances to step S712.

(Step S709) The terminal processing unit 23 performs processing according to the operation accepted in step S708.

(Step S710) The terminal processing unit 23 acquires operation information corresponding to the operation accepted in step S708, and configures information that is to be transmitted to the information processing apparatus 1. Note that the information that is to be transmitted to the information processing apparatus 1 typically contains operation information and a user identifier, and is referred to as operation information or the like. The operation information may be primitive information of an operation (e.g., an ID of a button that has been pressed, information that has been input, etc.), or information (e.g., a map identifier of map expression data that has been browsed, a browsing time, etc.) acquired from a group of one or more operations.

(Step S711) The terminal transmitting unit 24 transmits the operation information or the like configured in step S710, to the information processing apparatus 1. The procedure returns to step S701.

(Step S712) The terminal receiving unit 25 judges whether or not it has received the whole or part of map expression data for cache. If it has received the map expression data, the procedure advances to step S713, and, if otherwise, the procedure returns to step S701.

(Step S713) The terminal processing unit 23 accumulates the whole or part of the map expression data for cache received in step S712 in an unshown buffer. The procedure returns to step S701.

Hereinafter, a specific operation of the information system A in this embodiment will be described. FIG. 1 is a conceptual diagram of an information system A.

It is assumed that, in the map expression data storage unit 111, the map expression data management table shown in FIG. 8 is stored. The map expression data management table manages one or more records each having "ID", "static attribute value", "dynamic attribute value", and "map expression data".

"ID" is a map identifier. "Static attribute value" is a static attribute value of map expression data, and, in this example, has region specifying information, a scale factor of map expression data, an area of map expression data, a completion level of map expression data, and metadata. The region specifying information is a group of (latitude, longitude), and, since the map expression data "ID=M01, M02" is in the shape of a rectangle, the region specifying information has information of (latitude, longitude) at the upper left point and the lower right point of the rectangle. Since the map expression data "ID=M03" has eight corners, the region specifying information has information of eight sets of (latitude, longitude). The metadata in this example is the type of map expression data. "Static attribute value" is information input by a company that operates the information processing apparatus 1.

"Dynamic attribute value" is a dynamic attribute value of map expression data, and, in this example, is user action information. The user action information in this example has "number of DLs", "number of views per month", "average access time", and "evaluation value". "Number of DLs" is the total number of times that data is downloaded to one or more terminal apparatuses 2 to the present, and displayed on one or more terminal apparatuses 2. Note that "number of DLs" may also be the total number of times that data is downloaded to one or more terminal apparatuses 2 to the present. "Number of views per month" is the total number of times that data is displayed on one or more terminal apparatuses 2 in that month or the previous month. "Average access time" is an average of time periods during which data is displayed on terminal apparatuses 2. "Evaluation value" is an average of evaluation values from users.

"Dynamic attribute value" is information acquired by the processing unit 13 of the information processing apparatus 1 using operation information received from the terminal apparatus 2. That is to say for example, in the case in which map expression data is displayed on the terminal apparatus 2, the receiving unit 12 of the information processing apparatus 1 receives a map identifier of the displayed map expression data. The processing unit 13 increments "number of DLs" and "number of views per month" paired with the map identifier by 1. Note that, after a map identifier of the displayed map expression data is received, the processing unit 13 starts measurement of the display time period using an unshown clock.

Furthermore, in the case in which map expression data becomes undisplayed on the terminal apparatus 2, the receiving unit 12 of the information processing apparatus 1 receives information indicating that the data becomes undisplayed or a map identifier. The processing unit 13 acquires the time period during which the map expression data is displayed on the terminal apparatus 2 (time elapsed after the start of measurement of the display time period). The processing unit 13 changes "average access time" using this time period.

Furthermore, the receiving unit 12 of the information processing apparatus 1 receives a map identifier and an evaluation value from the terminal apparatus 2. The processing unit 13 changes the average of evaluation values paired with the map identifier.

"Map expression data" in this example is image data. It will be appreciated that "map expression data" may also be an image file.

Furthermore, in the storage unit 11, information for deciding on a score of map expression data is stored. It is assumed that the information in this example is an operation expression. The operation expression is an expression using a distance between position indicated by position specifying information and a representative point of map expression data (which may be simply referred to as a "distance"), a scale factor, an area, a completion level, metadata, the number of DLs, the number of views per month, an average access time, and an evaluation value. The operation expression is an expression in which the smaller the distance is, the larger the score is, an expression in which the smaller the scale factor is, the larger the score is, an expression in which the smaller the area is, the larger the score is, an expression in which the higher the completion level is (the larger the value of the completion level is), the larger the score is, an expression in which the larger the number of DLs is, the larger the score is, an expression in which the larger the number of views per month, the larger the score is, an expression in which the longer the average access time is, the larger the score is, and an expression in which the larger the evaluation value is, the larger the score is. It is assumed that the storage unit 11 holds information on which a score corresponding to metadata is based. The information on which a score is based is, for example, "illustrated map=2, old map=3, sketch map=1", or the like. The information for deciding on a score of map expression data may also be a table. The table is a table in which the score is determined if a distance, a scale factor, an area, a completion level, metadata, the number of DLs, the number of views per month, an average access time, or an evaluation value is determined. Note that the information for deciding on a score of map expression data may also be information for deciding on a score, using one or at least two of a distance, a scale factor, an area, a completion level, metadata, the number of DLs, the number of views per month, an average access time, and an evaluation value.

Furthermore, in the user information storage unit 112, the user information management table shown in FIG. 9 is stored. The user information management table is a table for managing one or more pieces of user information. The user information has "user identifier", "user attribute", "history information", and "current information". "User attribute" is an attribute value of a user, and, in this example, is "age" and "sex". "History information" is information regarding a history of map expression data browsed by a user, and, in this example, has "browsing date", "browsed map identifier" and "browsing time". "Browsed map identifier" is a map identifier of map expression data that has been browsed. "Current information" is information regarding map expression data that is currently being browsed by a user. "Current information" in this example has "map identifier of current browsing" and "browsing time". "Map identifier of current browsing" is a map identifier of map expression data of current browsing.

Furthermore, the storage unit 11 has the place name/position correspondence table shown in FIG. 10. The place name/position correspondence table is a table indicating correspondence between place name information and position information.

In this situation, the following four specific examples will be described. Specific Example 1 is an example in which one or more pieces of map expression data are displayed on the terminal apparatus 2 in the case in which the position specifying information is position information indicating the current position of a user. Specific Example 2 is an example in which one or more pieces of map expression data are displayed on the terminal apparatus 2 in the case in which the position specifying information is place name information. Specific Example 3 is an example in which, when map expression data is displayed, a user inputs an instruction to request map expression data that is to be displayed next. Specific Example 4 is an example in which map expression data for cache is downloaded to the terminal apparatus 2.

SPECIFIC EXAMPLE 1

Figure 11:
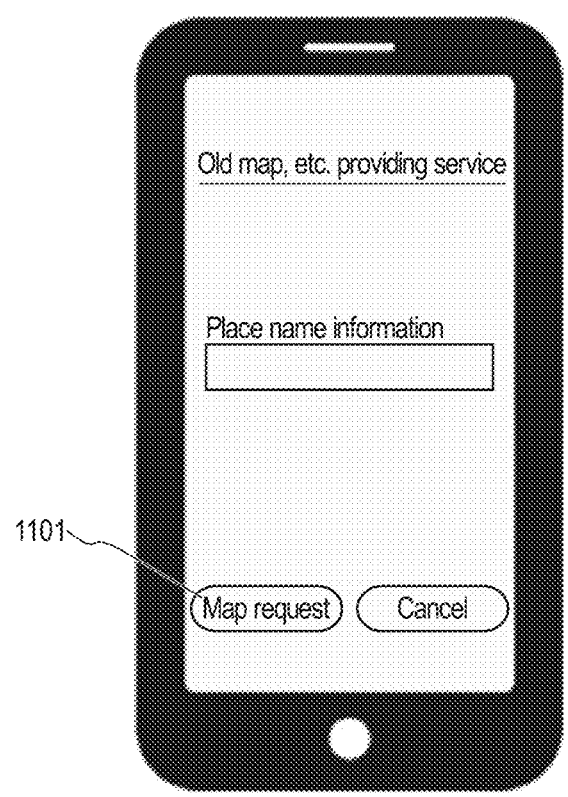
FIG. 11 shows a display example of the terminal apparatus 2 in embodiment.

It is assumed that a screen of an app "old map, etc. providing service" shown in FIG. 11 is displayed on the terminal apparatus 2 of a user.

It is assumed that the user presses a map request button. 1101 in FIG. 11 without inputting place name information. Then, the terminal accepting unit 22 accepts an instruction to request map expression data. Next, since the accepted request instruction does not contain place name information, the terminal processing unit 23 acquires current position information $(x_c, y_c)$ indicating the current position. Then, the terminal processing unit 23 reads the user identifier "U01" from the terminal storage unit 21. Next, the terminal processing unit 23 configures transmission information having the current position information $(x_c, y_c)$ and the user identifier "U01". Next, the terminal transmitting unit 24 transmits the transmission information to the information processing apparatus 1.

Next, the receiving unit 12 of the information processing apparatus 1 receives the transmission information having the current position information $(x_c, y_c)$ and the user identifier "U01", from the terminal apparatus 2.

Next, the data acquiring unit 131 acquires position information $(x_c, y_c)$ from the received transmission information. Then, the data acquiring unit 131 searches the map expression data management table in FIG. 8 for map expression data with a region containing the position information $(x_c, y_c)$. That is to say the data acquiring unit 131 checks each record in the map expression data management table, as to whether or not the position information $(x_c, y_c)$ is contained in a region specified with the region specifying information of the record. It is assumed that the data acquiring unit 131 judges that the position information $(x_c, y_c)$ is contained in the regions specified with the region specifying information of the records with "ID=M02, M03". Then, the data acquiring unit 131 temporarily stores "M02, M03" in an unshown buffer.

Next, the score acquiring unit 133 acquires history information paired with the user identifier "U01" from the user information management table in FIG. 9. The score acquiring unit 133 acquires a static attribute value and a dynamic attribute value of each piece of map expression data M02 and M03. Then, the score acquiring unit 133 calculates a score of each piece of map expression data M02 and M03 through the above-described operation expression, using the acquired user's history information, and static attribute value and dynamic attribute value of the map expression data. It is assumed that the score acquiring unit 133 acquires a score "87" of M02 and a score "48" of M03. Next, the score acquiring unit 133 accumulates the scores in an unshown buffer in association with the map expression data identifiers. That is to say, "(M02, 87), (M03, 48)" is accumulated in the unshown buffer.

Next, the sorting unit 132 sorts the map expression data identifiers in descending order of the scores in the unshown buffer, thereby obtaining (M02, M03).

Next, the sorting unit 132 acquires the map expression data in the order of (M02, M03) from the map expression data management table.

Next, the transmitting unit 14 transmits the map expression data in the order of (M02, M03) to the terminal apparatus 2.

Figure 12:
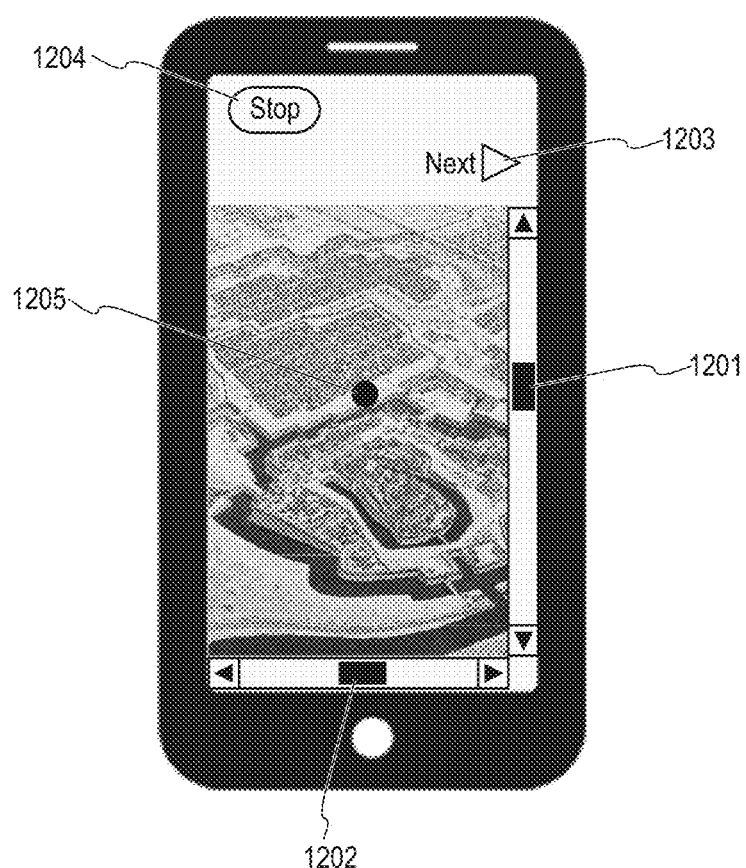
FIG. 12 shows a display example of the terminal apparatus 2 in this embodiment.

Next, the terminal receiving unit 25 of the terminal apparatus 2 receives the two pieces of map expression data (M02, M03) from the information processing apparatus 1. Next, the terminal processing unit 23 accumulates the received two pieces of map expression data in an unshown buffer in the order of (M02, M03). Next, the terminal output unit 26 displays the map expression data "M02" at the first order in the buffer. FIG. 12 shows the display example. Scroll bars 1201 and 1202 in FIG. 12 are for scrolling map expression data. A button 1203 is for displaying next map expression data. A "stop" button 1204 is for ending display of display of map expression data. A mark 1205 indicates the current position $(x_c, y_c)$. Note that the terminal processing unit 23 calculates the coordinate values of the current position $(x_c, y_c)$ in the map expression data. Then, the terminal output unit 26 displays a mark at a point indicated by the coordinate values.

Figure 13:
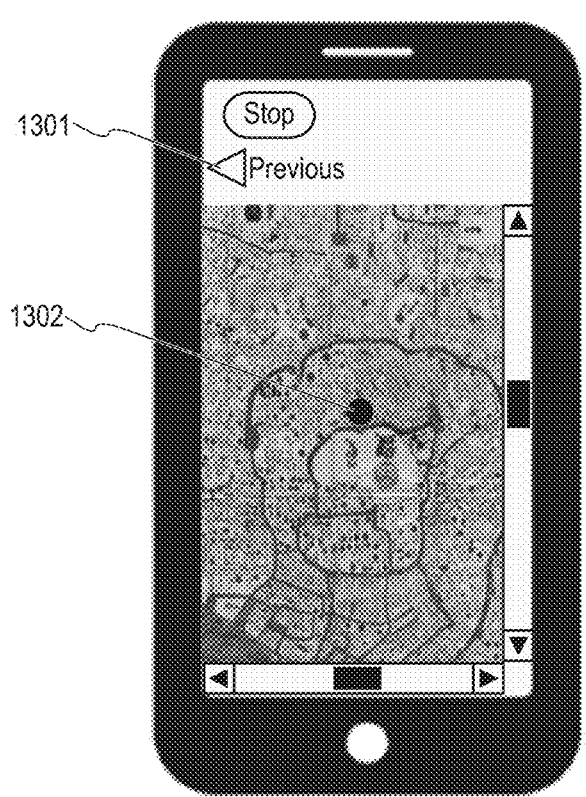
FIG. 13 shows a display example of the terminal apparatus 2 in this embodiment.

In this situation, if a user presses the button 1203, the map expression data that is displayed changes to the map expression data M03, and the display becomes the state shown in FIG. 13. In FIG. 13, a button 1301 is for returning to the display of the map expression data "M02. A mark 1302 indicates the current position $(x_c, y_c)$.

Then, the terminal processing unit 23 of the terminal apparatus 2 configures operation information or the like (containing the user identifier "U01") such as display of map expression data, and the terminal transmitting unit 24 transmits the operation information or the like to the information processing apparatus 1.

Next, the receiving unit 12 of the information processing apparatus 1 receives operation information or the like from the terminal apparatus 2. Then, the processing unit 13 accumulates the received operation information in the user information storage unit 112 in association with the user identifier "U01".

Note that in this specific example, it is also possible that the terminal output unit 26 displays all of the received two pieces of map expression data (M02, M03). Then, it is also possible that the terminal accepting unit 22 accepts selection of map expression data by a user, and the terminal output unit 26 displays the selected map expression data.

SPECIFIC EXAMPLE 2

It is assumed that a screen of an app "old map, etc. providing service" shown in FIG. 11 is displayed on the terminal apparatus 2 of a user.

Figure 14:
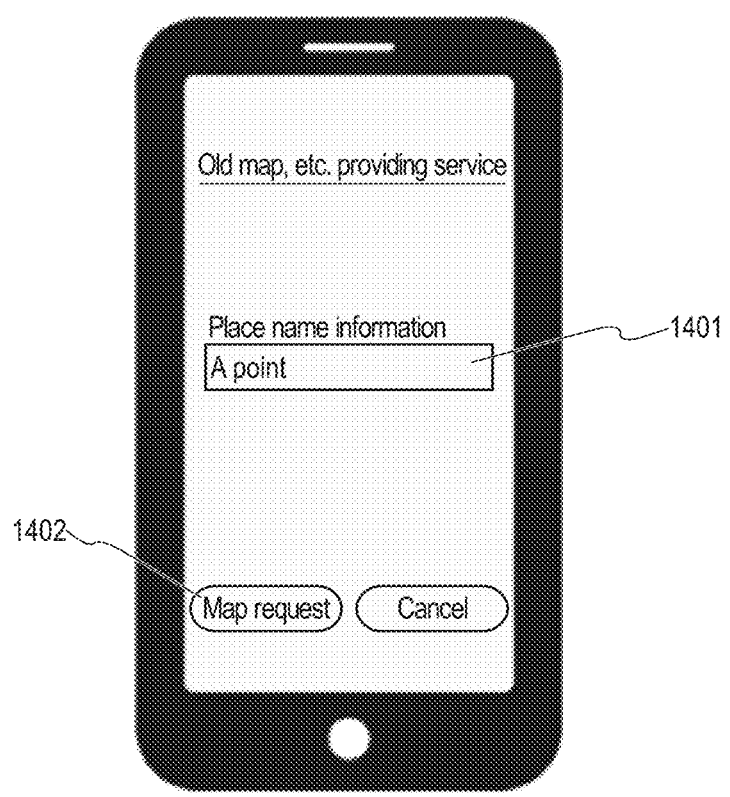
FIG. 14 shows a display example of the terminal apparatus 2 in this embodiment.

It is assumed that the user inputs place name information "A point" (see 1401 in FIG. 14), and presses a map request button 1402 in FIG. 14. Then, the terminal accepting unit 22 accepts an instruction to request map expression data. Next, since the accepted request instruction contains place name information, the terminal processing unit 23 acquires position specifying information "A point". Then, the terminal processing unit 23 reads the user identifier "U01" from the terminal storage unit 21. Next, the terminal processing unit 23 configures transmission information having the position specifying information "A point" and the user identifier "U01". Next, the terminal transmitting unit 24 transmits the transmission information to the information processing apparatus 1.

Next, the receiving unit 12 of the information processing apparatus 1 receives the transmission information having the position specifying information "A point" and the user identifier "U01" from the terminal apparatus 2.

Next, the data acquiring unit 131 acquires position information ($x_a$, $y_a$) paired with the received position specifying information "A point". Then, the data acquiring unit 131 searches the map expression data management table in FIG. 8 for map expression data with a region containing the position information ($x_a$, $y_a$). It is assumed that the data acquiring unit 131 judges that the position information ($x_a$, $y_a$) is contained in the regions specified with the region specifying information of the records with "ID=M02, M03". Then, the data acquiring unit 131 temporarily stores "M02, M03" in an unshown buffer.

Next, the score acquiring unit 133 acquires history information paired with the user identifier "U01" from the user information management table in FIG. 9. The score acquiring unit 133 acquires a static attribute value and a dynamic attribute value of each piece of map expression data M02 and M03. Then, the score acquiring unit 133 calculates a score of each piece of map expression data M02 and M03 through the above-described operation expression, using the acquired user's history information, and static attribute value and dynamic attribute value of the map expression data. It is assumed that the score acquiring unit 133 acquires a score "87" of M02 and a score "48" of M03. Next, the score acquiring unit 133 accumulates the scores in an unshown buffer in association with the map expression data identifiers. That is to say "(M02, 87), (M03, 48)" is accumulated in the unshown buffer.

Next, the sorting unit 132 sorts the map expression data identifiers in descending order of the scores in the unshown buffer, thereby obtaining (M02, M03).

Next, the sorting unit 132 acquires only the map expression data "M02" at the first order, out of (M02, M03), from the map expression data management table.

Next, the transmitting unit 14 transmits the map expression data "M02" to the terminal apparatus 2.

Figure 15:
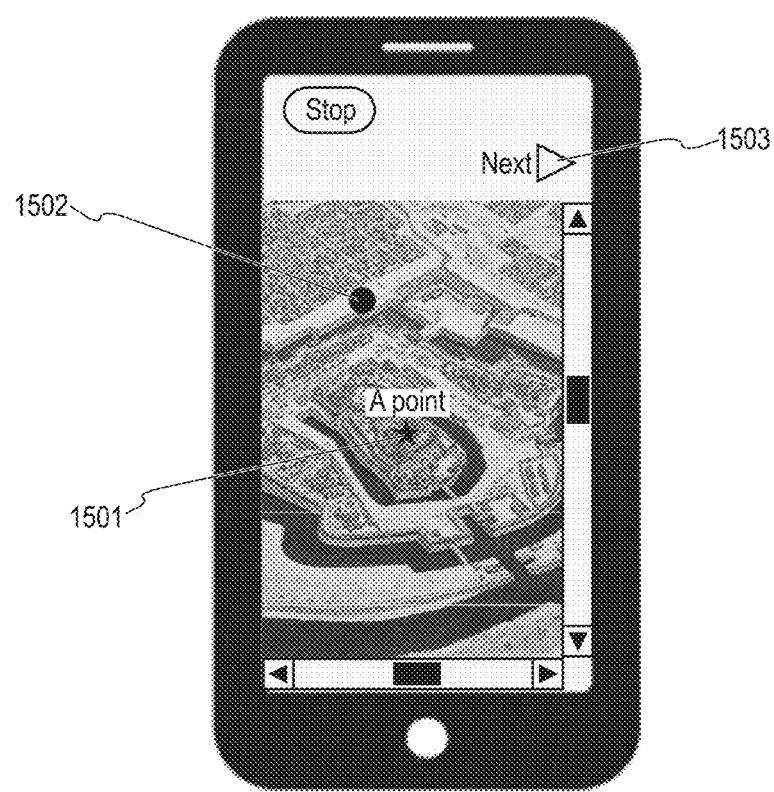
FIG. 15 shows a display example of the terminal apparatus 2 in this embodiment.

Next, the terminal receiving unit 25 of the terminal apparatus 2 receives the map expression data "M02" from the information processing apparatus 1. Next, the terminal output unit 26 displays the received map expression data "M02". FIG. 15 shows the display example. In FIG. 15, a mark 1501 indicates the position of the point "A point" input by the user, and the character string "A point" of the point input by the user is also displayed on the map expression data. The terminal processing unit 23 acquires coordinate values corresponding to the position information ($x_a$, $y_a$) indicating the position "A point". Then, the terminal output unit 26 displays the mark and the character string "A point" at the position corresponding to the coordinate values. The terminal processing unit 23 acquires the current position information ($x_c$, $y_c$), and calculates the coordinate values of the current position ($x_c$, $y_c$) in the map expression data. Then, the terminal output unit 26 displays a mark at a point indicated by the coordinate values (see 1502).

Furthermore, the terminal processing unit 23 of the terminal apparatus 2 configures operation information or the like (containing the user identifier "U01") indicating that the map expression data has been displayed, and the terminal transmitting unit 24 transmits the operation information or the like to the information processing apparatus 1.

Next, the receiving unit 12 of the information processing apparatus 1 receives operation information or the like from the terminal apparatus 2. Then, the processing unit 13 accumulates the received operation information in the user information management table in association with the user identifier "U01".

SPECIFIC EXAMPLE 3

In FIG. 15, it is assumed that, when the map expression data "M02" is displayed, a user presses a next button 1503. The next button 1503 is for searching for map expression data, using the displayed map expression data.

Then, the terminal accepting unit 22 accepts an instruction to request map expression data. Next, the terminal processing unit 23 acquires position specifying information (a map identifier "M02" of the displayed map expression data, in this example) corresponding to the accepted request instruction. Note that the terminal processing unit 23 may acquire a map identifier "M02" of the displayed map expression data and specific coordinate values of the displayed map (e.g., coordinate values at the center of the map in the display). Then, the terminal processing unit 23 acquires a user identifier "U01" from the terminal storage unit 21, and configures information having the position specifying information "M02" and the user identifier "U01". Next, the terminal transmitting unit 24 transmits the configured information containing the position specifying information, to the information processing apparatus 1.

Next, the receiving unit 12 of the information processing apparatus 1 receives the information having the position specifying information "M02" and the user identifier "U01".

Next, the data acquiring unit 131 acquires position information ($x_{M02}$, $y_{M02}$), using the received position specifying information "M02". It is assumed that the position information ($x_{M02}$, $y_{M02}$) is information indicating a representative position (e.g., the center position) of the map expression data "M02", and is stored in the map expression data management table although not shown.

Next, the data acquiring unit 131 searches the map expression data management table in FIG. 8 for map expression data other than "M02", the data being map expression data with a region containing the position information ($x_{M02}$, $y_{M02}$). That is to say, the data acquiring unit 131 checks each record other than "M02" in the map expression data management table, as to whether or not the position information ($x_{M02}$, $y_{M02}$) is contained in a region specified with the region specifying information of the record. It is assumed that the data acquiring unit 131 judges that the position information ($x_{M02}$, $y_{M02}$) is contained in the region specified with the region specifying information of the record "ID=M03". Then, the data acquiring unit 131 acquires map expression data paired with "M03" from the map expression data management table.

Next, the transmitting unit 14 transmits the map expression data M03 to the terminal apparatus 2.

Next, the terminal receiving unit 25 of the terminal apparatus 2 receives the map expression data M03 from the information processing apparatus 1. Next, the terminal output unit 26 displays the map expression data "M03". FIG. 13 shows the display example.

Furthermore, the terminal processing unit 23 of the terminal apparatus 2 configures operation information or the like (containing the user identifier "U01") indicating that the map expression data "M03" has been displayed, and the terminal transmitting unit 24 transmits the operation information or the like to the information processing apparatus 1.

Then, the receiving unit 12 of the information processing apparatus 1 receives operation information or the like from the terminal apparatus 2. Then, the processing unit 13 accumulates the received operation information in the user information storage unit 112 in association with the user identifier "U01".

Note that, in Specific Example 3, if there are multiple pieces of map expression data with a region containing the position information ($x_{M02}$, $y_{M02}$), the score acquiring unit 133 may calculate scores, and the data acquiring unit 131 may acquire map expression data whose score is high enough to satisfy a predetermined condition. Then, the transmitting unit 14 may transmit map expression data whose score is high enough to satisfy a predetermined condition, to the terminal apparatus 2.

SPECIFIC EXAMPLE 4

Next, it is assume the information processing apparatus 1 judges that the state in which a user "U01" has kept the terminal apparatus 2 displaying map expression data "M03" for one minute or more, and that there may be a request for next map expression data. That is to say, the time period during which the same map expression data is displayed reaches a threshold (one minute, in this example), and the second data acquiring unit 134 judges to transmit map expression data that is to be cached by one terminal apparatus 2.

Next, the second data acquiring unit 134 acquires history information paired with the user identifier "U01" of the terminal apparatus 2 to which map expression data for cache is to be transmitted, from the user information management table.

It is assumed that the second data acquiring unit 134 acquires current information (a map identifier "M03" of current browsing, browsing time "1 m 02 s") paired with the user identifier "U01".

Next, the second data acquiring unit 134 acquires the type of map expression data "old map" preferred by the user, using the map identifiers "M09", "M01", and "M29" of past browsing in the history information and the map identifier "M03" of current browsing in the current information. Then, the second data acquiring unit 134 acquires position information ($x_{M03}$, $y_{M03}$) of a representative point of the map identifier "M03" of current browsing. Then, the second data acquiring unit 134 searches the map expression data management table for one or more pieces of map expression data with a region containing the position information ($x_{M03}$, $y_{M03}$) and paired with the metadata "old map".

Next, the score acquiring unit 133 calculates a score of each of the one or more pieces of map expression data obtained by the search, through the above-described algorithm.

Next, the second data acquiring unit 134 acquires one or more pieces of map expression data whose score is high enough to satisfy a predetermined condition. The state in which a score is high enough to satisfy a predetermined condition is, for example, a state in which the score is in the top N (N is a natural number of 1 or more) or the score is greater than or equal to a threshold.

Next, the transmitting unit 14 transmits all or part of the one or more pieces of map expression data acquired by the second data acquiring unit 134, to the terminal apparatus 2 with the user identifier "U01".

Next, the terminal receiving unit 25 of the terminal apparatus 2 receives the whole or part of the map expression data for cache. Next, the terminal processing unit 23 accumulates the received whole or part of the map expression data for cache in an unshown buffer.

Figure 16:
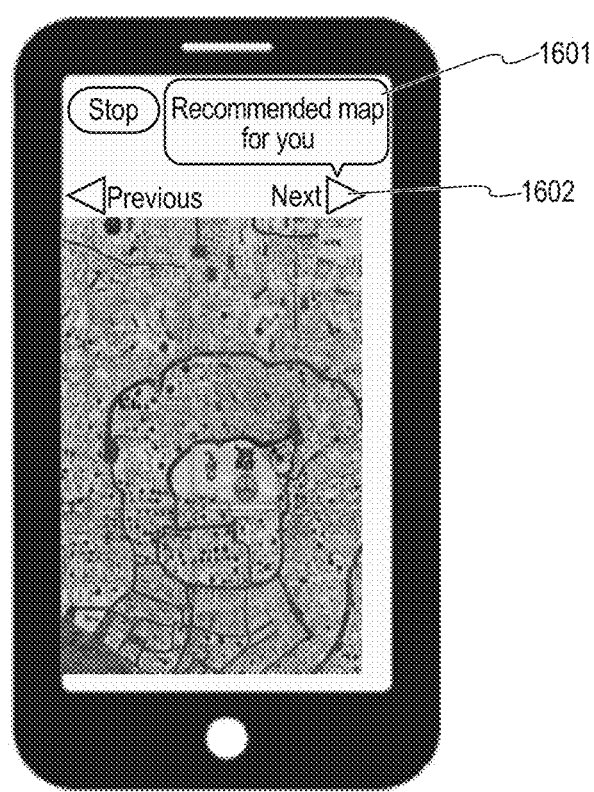
FIG. 16 shows a display example of the terminal apparatus 2 in this embodiment.

Then, the terminal output unit 26 performs display for a user indicating that there is next map expression data recommended for a user. FIG. 16 shows the display example. That is to say, since the map expression data is cached, the display on the terminal apparatus 2 changes from the state in FIG. 13 to that in FIG. 16. In FIG. 16, 1601 indicates that there is next map expression data recommended for a user. Then, if the user presses a next button 1602, map expression data that has been cached (stored in the buffer) is displayed on the terminal apparatus 2.

As described above, according to this embodiment, it is possible to easily provide a user with appropriate map expression data.

Furthermore, according to this embodiment, it is possible to easily provide a user with appropriate map expression data, in an appropriate order.

Moreover, according to this embodiment, it is possible to easily provide a user with appropriate map expression data, without stress.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the information processing apparatus 1 in this embodiment is the following sort of program. Specifically, this program is, for example, a program for causing a computer capable of accessing a storage medium including a map expression data storage unit in which two or more pieces of map expression data expressing a map are stored, the data being associated with one or more attribute values containing region specifying information for specifying a region that is being expressed, to function as: a receiving unit that receives position specifying information for specifying a position from a terminal apparatus; a data acquiring unit, that acquires one or more pieces of map expression data associated with region specifying information corresponding to a position specified with the position specifying information, from the map expression data storage unit; and a transmitting unit that transmits the one or more pieces of map expression data acquired by the data acquiring unit, to the terminal apparatus.

Figure 17:
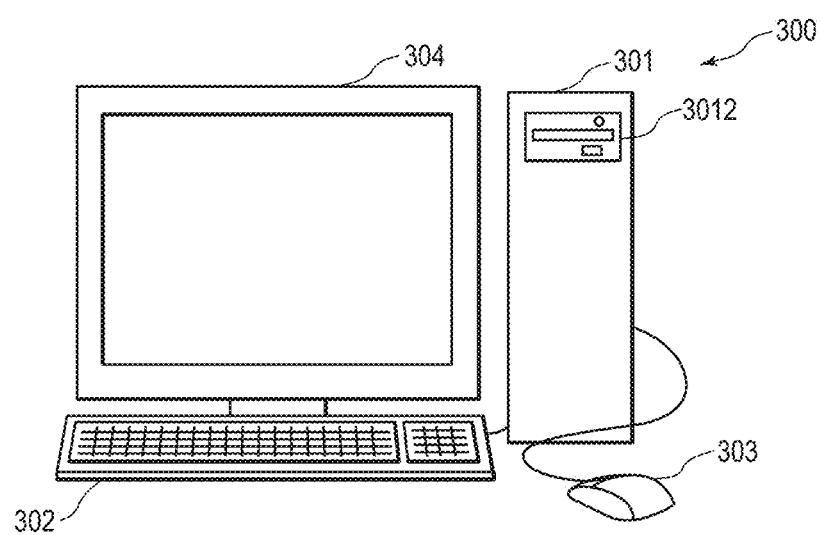
FIG. 17 is a schematic view of a computer system in this embodiment.
Figure 18:
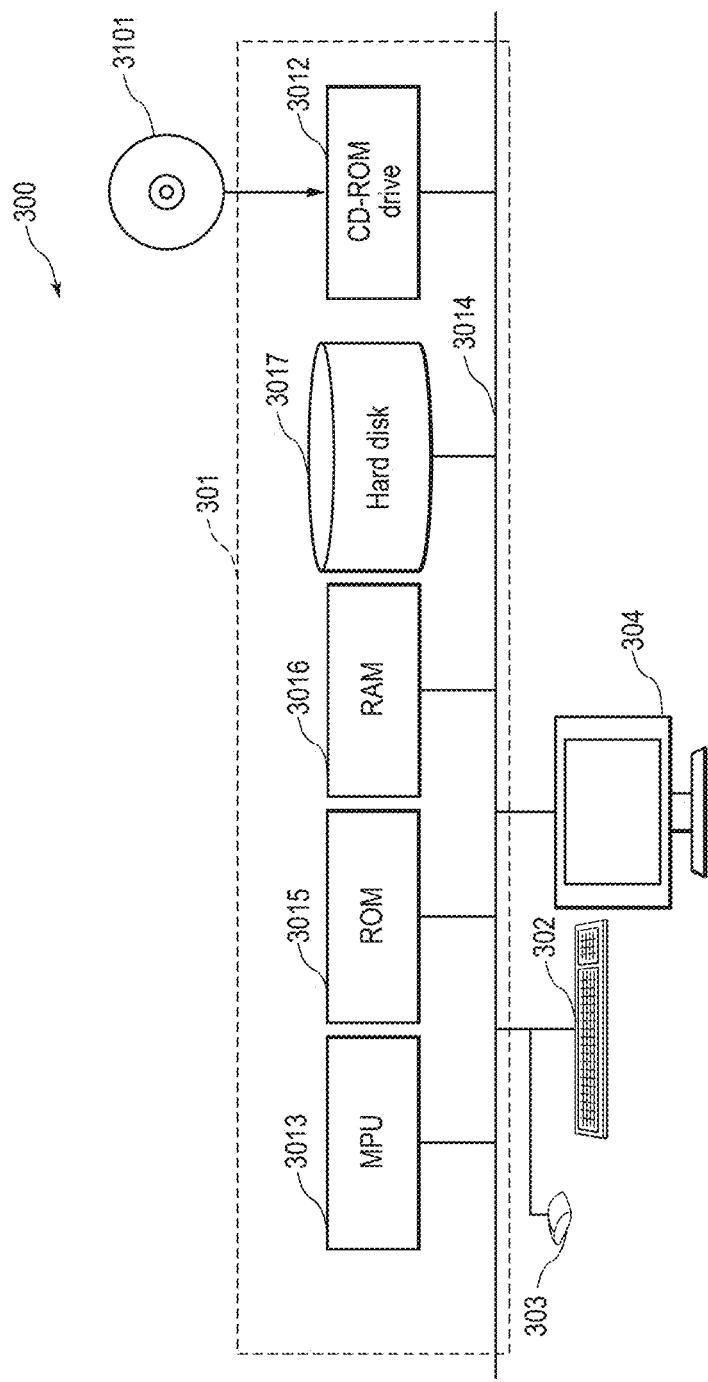
FIG. 18 is a block diagram of the computer system in this embodiment.

FIG. 17 shows the external appearance of a computer that executes the program described in this specification to realize the information processing apparatus and the like in the foregoing various embodiments. The foregoing embodiments may be realized using computer hardware and a computer program executed thereon. FIG. 17 is a schematic view of a computer system 300. FIG. 18 is a block diagram of the system 300.

In FIG. 17, the computer system 300 includes a computer 301 including a CD-ROM drive 3012, a keyboard 302, a mouse 303, and a monitor 304.

In FIG. 18, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the information processing apparatus 1 and the like in the foregoing embodiments may be stored in a CD-ROM 3101 that is inserted into the CD-ROM drive 3012, and be transmitted to the hard disk 3017. Alternatively the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the information processing apparatus 1 and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the program may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process may be realized as centralized processing using a single apparatus, or may be realized as distributed processing using multiple apparatuses. That is to say the information processing apparatus 1 may be a stand-alone apparatus.

The present invention is not limited to the embodiment set forth herein. Various modifications are possible within the scope of the present invention.

INDUSTRIAL APPLICABILITY

As described above, the information processing apparatus according to the present invention has the effect of making it possible to provide a user with appropriate map expression data, and thus this apparatus is useful as an information processing apparatus and the like.

LIST OF REFERENCE NUMERALS

1 Information processing apparatus
2 Terminal apparatus
11 Storage unit
12 Receiving unit
13 Processing unit
14 Transmitting unit
21 Terminal storage unit
22 Terminal accepting unit
23 Terminal processing unit
24 Terminal transmitting unit
25 Terminal receiving unit
26 Terminal output unit
111 Map expression data storage unit
112 User information storage unit
131 Data acquiring unit
132 Sorting unit
133 Score acquiring unit
134 Second data acquiring unit

The invention claimed is:
1. An information processing apparatus comprising:
a map expression data storage which is a first non-transitory computer readable memory and in which two or more pieces of map expression data each expressing a map of which area is limited are stored, the map expression data being associated with one or more attribute values containing region specifying information for specifying a region that is being expressed; and
a processor and a non-transitory program memory storing a program, wherein the program, when executed by the processor causes the processor to:
receive position specifying information for specifying a position from a terminal apparatus;
acquire two or more pieces of the map expression data associated with the region specifying information corresponding to the position specified with the position specifying information, from the map expression data storage;
sort the two or more pieces of the map expression data, using the one or more attribute values associated with each of the two or more pieces of the map expression data; and
transmit the two or more pieces of the map expression data acquired, to the terminal apparatus, wherein:
each of the two or more pieces of the map expression data has a center position, as a representative point, and
the one or more attribute values comprises a distance between the position indicated by position specifying information and the representative point of each of the two or more pieces of the map expression data, respectively.

2. The information processing apparatus according to claim 1, wherein:
the executed program further causes the processor to acquire a score of each of the two or more pieces of the map expression data, using one or more of the attribute values associated with the map expression data, and
sort the two or more pieces of the map expression data, using the score as a key.

3. The information processing apparatus according to claim 2, wherein the one or more attribute values further comprises at least one of:
a scale factor of the map expression data,
an area of the map expression data, or
user action information regarding an action of users to the map expression data.

4. The information processing apparatus according to claim 3, wherein the user action information is history information based on an operation of the users on the map expression data from the past to the present.

5. The information processing apparatus according to claim 1, wherein the position specifying information comprises at least one of:
current position information indicating a current position at which the terminal apparatus is located,
position information corresponding to a map or each of the two or more pieces of the map expression data that is being output by the terminal apparatus,
position information specified with place name information indicating a name of a location accepted by the terminal apparatus,
the map or each of the two or more pieces of the map expression data that is being output by the terminal apparatus, or
the place name information accepted by the terminal apparatus.

6. The information processing apparatus according to claim 1,
wherein the map expression data is contained in a file,
two or more pieces of the map expression data are contained in one file,
the executed program further causes the processor to acquire one or more files containing map expression data associated with the region specifying information corresponding to the position specified with the position specifying information, from the map expression data storage, and
transmit the one or more files, as the two or more pieces of the map expression data, to the terminal apparatus.

7. The information processing apparatus according to claim 1, wherein each pieces of the map expression data comprises one of an old map, an illustrated map, a sketch map, or a hand-written map, of which area is limited.

8. The information processing apparatus according to claim 1, wherein the one or more attribute values further comprises at least one of:
a scale factor of the map expression data,
an area of the map expression data,
a completion level of the map expression data,
a theme of the map expression data,
a type of the map expression data,
a name, a landscape or place that is in the region in the map expression data, or
user action information regarding an action of users to the map expression data.

9. The information processing apparatus according to claim 1, wherein:
the one or more attribute values further comprises at least one of:
history information based on an operation of users on the map expression data from past to present including at least one of a number of downloads by the users in the past, a number of views per month, an average access time, a number of stars, an average of evaluation values from the users, or a number of comments from the users to the map expression data, or
current information based on a current operation of a user on the map expression data including at least one of a map identifier for identifying the map expression data that is currently being output or an output time period of the map expression data that is currently being output.

10. An information processing apparatus comprising:
a map expression data storage which is a first non-transitory computer readable memory and in which two or more pieces of map expression data each expressing a map are stored, the map expression data being associated with one or more attribute values containing region specifying information for specifying a region that is being expressed; and
a processor and a non-transitory program memory storing a program, wherein the program, when executed by the processor causes the processor to:
receive position specifying information for specifying a position from a terminal apparatus;
acquire a first piece of the map expression data associated with the region specifying information corresponding to the position specified with the position specifying information, from the map expression data storage;
transmit the first piece of the map expression data to the terminal apparatus;
after the position specifying information is received, acquire one or more attribute value of the first piece of the map expression data;
acquire a second piece of the map expression data based on the one or more attribute value of the first piece of the map expression data, and
transmit the second piece pieces of the map expression data, to the terminal apparatus.

11. The information processing apparatus according to claim 10, further comprising:
a user information storage which is a second non-transitory computer readable memory and in which one or more pieces of user information having a user identifier for identifying a user and history information regarding an operation of the user on the map expression data are stored,
wherein the executed program further causes the processor to receive the user identifier as well, and acquire the second piece of the map expression data, using the history information paired with the user identifier.

12. The information processing apparatus according to claim 10, wherein the second piece of the map expression data is acquired after the first piece of the map expression data is transmitted.

13. The information processing apparatus according to claim 10, wherein the second piece of the map expression data is acquired when a predetermined time period has passed after the first piece of the map expression data is transmitted.

14. The information processing apparatus according to claim 10, wherein each pieces of the map expression data comprises one of an old map, an illustrated map, a sketch map, or a hand-written map, of which area is limited.

15. The information processing apparatus according to claim 10, wherein the executed program further causes the processor to, in acquiring the second piece of the map expression data:
acquire two or more pieces of the map expression date as the second piece of the map expression data;
sort the two or more pieces of the map expression data, using the one or more attribute values associated with each of the two or more pieces of the map expression data; and
transmit the two or more pieces of the map expression data to the terminal apparatus.

16. The information processing apparatus according to claim 15, wherein the one or more attribute values comprises a distance between the position indicated by position specifying information and a representative point of each of the two or more pieces of the map expression data.

17. An information processing method realized using a map expression data storage which is a non-transitory computer readable memory and in which two or more pieces of map expression data each expressing a map of which area is limited are stored, the map expression data being associated with one or more attribute values containing region specifying information for specifying a region that is being expressed, and a processor, comprising:

a receiving step of the processor receiving position specifying information for specifying a position from a terminal apparatus;
a data acquiring step of the processor acquiring two or more pieces of the map expression data associated with the region specifying information corresponding to the position specified with the position specifying information, from the map expression data storage;
a sorting step of the processor sorting the two or more pieces of the map expression data, using the one or more attribute values associated with each of the two or more pieces of the map expression data; and
a transmitting step of the processor transmitting the two or more pieces of the map expression data acquired in the data acquiring step, to the terminal apparatus, wherein:
each of the two or more pieces of the map expression data has a center position, as a representative point, and
the one or more attribute values comprises a distance between the position indicated by position specifying information and the representative point of each of the two or more pieces of the map expression data, respectively.

18. The information processing method according to claim 17, wherein each pieces of the map expression data comprises one of an old map, an illustrated map, a sketch map, or a hand-written map, of which area is limited.

* * * * *